United States Patent
Fujii et al.

(10) Patent No.: US 12,234,535 B2
(45) Date of Patent: Feb. 25, 2025

(54) WEATHERING STEEL FOR SOLID-STATE WELDING, WEATHERING STEEL MATERIAL FOR SOLID-STATE WELDING, SOLID-STATE WELDED STRUCTURE AND SOLID-STATE WELDING METHOD

(71) Applicant: OSAKA UNIVERSITY, Suita (JP)

(72) Inventors: Hidetoshi Fujii, Suita (JP); Kohsaku Ushioda, Suita (JP); Tomoya Nagira, Suita (JP); Yoshiaki Morisada, Suita (JP)

(73) Assignee: OSAKA UNIVERSITY, Suita (JP)

( * ) Notice: Subject to any disclaimer, the term of this patent is extended or adjusted under 35 U.S.C. 154(b) by 513 days.

(21) Appl. No.: 17/435,875

(22) PCT Filed: Feb. 20, 2020

(86) PCT No.: PCT/JP2020/006684
§ 371 (c)(1),
(2) Date: Sep. 2, 2021

(87) PCT Pub. No.: WO2020/184124
PCT Pub. Date: Sep. 17, 2020

(65) Prior Publication Data
US 2022/0145435 A1    May 12, 2022

(30) Foreign Application Priority Data

Mar. 12, 2019    (JP) .................. 2019-044619

(51) Int. Cl.
*C22C 38/00* (2006.01)
*B23K 20/00* (2006.01)
(Continued)

(52) U.S. Cl.
CPC .............. *C22C 38/20* (2013.01); *B23K 20/12* (2013.01); *B23K 20/122* (2013.01);
(Continued)

(58) Field of Classification Search
CPC ................ C22C 38/001; C22C 38/002; C22C 38/005; C22C 38/02; C22C 38/06; C22C 38/00;
(Continued)

(56) References Cited

U.S. PATENT DOCUMENTS

| | | | |
|---|---|---|---|
| 2016/0186299 A1* | 6/2016 | Minami | C21D 8/0247 148/330 |
| 2018/0127856 A1* | 5/2018 | Takashima | C21D 6/005 |

(Continued)

OTHER PUBLICATIONS

CN-1752260A computer English Translation (Year: 2023).*

(Continued)

*Primary Examiner* — Erin B Saad
(74) *Attorney, Agent, or Firm* — WHDA, LLP

(57) ABSTRACT

The present invention provides a weathering steel for solid-state welding that forms an excellent weld when subjected to solid-state welding and has tensile properties equivalent or superior to those of high tensile strength steel, said steel having weathering properties superior to those of conventional weathering steel for welding, wherein the reliability of the weld is equivalent or superior to that of the parent material; and a weathering steel material for solid-state welding. Further, there is provided a solid-state welded structure that includes the weathering steel for solid-state welding according to the present invention, and a solid-state welding method for said weathering steel for solid-state welding. The weathering steel for solid-state welding having a steel composition comprises, in % by mass, C: 0.10 to 0.60% and P: more than 0.035 to 1.000%, with the remainder consisting of Fe and unavoidable impurities.

12 Claims, 19 Drawing Sheets

Surface appearance photograph

(51) Int. Cl.
  *B23K 20/12* (2006.01)
  *C22C 38/02* (2006.01)
  *C22C 38/04* (2006.01)
  *C22C 38/20* (2006.01)
  *B23K 103/04* (2006.01)

(52) U.S. Cl.
  CPC ............ *C22C 38/002* (2013.01); *C22C 38/02* (2013.01); *C22C 38/04* (2013.01); *B23K 2103/04* (2018.08)

(58) Field of Classification Search
  CPC ......... C22C 38/04; C22C 38/08; C22C 38/16; C22C 38/38; C22C 38/60; C22C 18/00; C22C 38/008; C22C 38/10; C22C 38/105; C22C 38/12; C22C 38/14; C22C 38/20; C22C 38/26; C22C 38/28; C22C 38/32; C22C 38/42; C22C 38/44; C22C 38/46; C22C 38/48; C22C 38/50; C22C 38/52; C22C 38/54; C21D 2211/005; C21D 2211/009

See application file for complete search history.

(56) References Cited

U.S. PATENT DOCUMENTS

| | | | |
|---|---|---|---|
| 2018/0148809 A1* | 5/2018 | Okamoto | C22C 38/02 |
| 2020/0270718 A1* | 8/2020 | Santacreu | C22C 38/50 |
| 2020/0283862 A1* | 9/2020 | Tsuchihashi | C21D 8/0273 |

OTHER PUBLICATIONS

Shin et al. (Formation of Fine Cementite Precipitates by Static Annealing of Equal-Chanel Angular Pressed Low-Carbon Steels, Acta Materialia, 49 (2001) p. 2387-2393) (Year: 2001).*

* cited by examiner

Fig. 16

| | Ex. steel 2 for solid-state welding | Ex. Steel 3 for solid-state welding |
|---|---|---|
| Stirred portion structure | B + M | Fine F+B+M |
| Fracture surface | Brittle fracture | Ductile fracture |

WEATHERING STEEL FOR SOLID-STATE WELDING, WEATHERING STEEL MATERIAL FOR SOLID-STATE WELDING, SOLID-STATE WELDED STRUCTURE AND SOLID-STATE WELDING METHOD

TECHNICAL FIELD

The present invention relates to a weathering steel for solid-state welding which is suitably usable for solid-state welding, a weathering steel material for solid-state welding, a solid-state welded structure having the weathering steel for solid-state welding, and a solid-state welding method for the weathering steel for solid-state welding.

PRIOR ARTS

A solid-state welding method that can reduce the decrease in strength of the welded portion as compared with the conventional melt welding has attracted attention, and in particular, a solid-state welding method that utilizes the frictional heat generation phenomenon and the plastic deformation of the metal material has been actively studied. Examples of the solid-state welding method include "Friction Stir Welding (FSW)" in which a columnar tool rotating at a high speed is inserted into materials to be welded to fix them, "Friction welding" in which a columnar material to be welded which is rotating is brought into contact with a material to be welded which is fixed and then welded each other, and "Linear Friction Welding" in which materials to be welded are welded by reciprocating them in a state of being in contact with each other.

Conventional steel materials are often designed with alloys premised on the use of melt welding, but in recent years, studies on steel materials suitable for the solid-state welding method have also been promoted, for instance, according to Patent Literature 1 (JP2008-31494A), there is disclosed a low-alloy structural steel, wherein the sum of the temperature range width of ferrite single phase and the temperature range width of two phases of austenite and ferrite phases, in an equilibrium state of 600° C. or more, is made to 200° C. or more.

In the low-alloy structural steel described in Patent Document 1, deformation resistance of steel in the friction stir welding can be remarkably reduced by enlarging the range of ferrite single phase and the range of two phases of austenite and ferrite phases, and as the result, the durability of the rotating tool is improved, and restrictions on welding conditions such as welding speed are relaxed. In addition, the frequency of replacement work due to wear and tear of the tool is suppressed, and the welding time is shortened, so that the working efficiency is improved.

Further, studies on steel suitable for the friction stir processing, which is a surface modification technique utilizing the principle of friction stir welding, have also been promoted, for instance, according to Patent Literature 2 (JP2014-162971A), there is disclosed a steel for friction stir processing including, in % by mass, C: 0.40 to 1.50%, Si: 0.15 to 2.00%, Mn: 0.30 to 2.00%, Cr: 0.50 to 3.00%, with the balance being Fe and inevitable impurities.

In the steel for friction stir welding described in Patent Document 2, excellent surface hardening can be achieved by applying the friction stir welding process.

Further, the present inventors also disclose in Patent Document 3 (JP2018-16866A) a steel for friction stir welding characterized in that the steel composition contains, by mass %, C: 0.20 to 0.45% and Cr: 1.00 to 3.50%, and carbon equivalent CE defined by the A formula of 0.40 to 1.00% by mass. $CE=C+Mn/6+(Cu+Ni)/15+(Cr+Mo+V)/5$ (A), wherein the element symbols represent content of each component in the steel material for friction stir welding, by unit % by mass.

In the steel for friction stir welding described in Patent Document 3, there can be provided a steel which can give welding characteristics (tensile strength and fracture toughness of the like of a stir zone) equal to and more than conventional high strength steel by friction stir welding and to which only relatively inexpensive alloy elements are added at minimum, and a method for friction stir welding of the steel as a material to be welded.

CITATION LIST

Patent Literature

Patent Literature 1: JP2008-31494A
Patent Literature 2: JP2014-162971A
Patent Literature 3: JP2018-16866A

SUMMARY OF INVENTION

Technical Problem

However, the low-alloy structural steel disclosed in Patent Document 1 facilitates the application of the friction stir welding to the steel by reducing the deformation resistance of the steel during the processing step, and there are less consideration as to the mechanical performances of the welded portion (stir zone) or the cost and availability of the elements added to the steel. Further, in recent years, the demand for long-term reliability of steel structures has been increasing, and the low-alloy structural steel disclosed in Patent Document 1 has not been considered for weather resistance at all.

Further, the steel for friction stir processing disclosed in Patent Document 2 has an optimized composition for surface quenching using frictional heat, and the design guideline is completely different from that of the steel material which has an object of ensuring the mechanical properties of the welded portion.

Furthermore, in the steel for friction stir welding disclosed in Patent Document 3, though it is possible to obtain joint characteristics equal to or higher than those of general high-strength steel, the weathering resistance of the steel is not considered at all, and it cannot be suitably used for structures such as bridges that require corrosion resistance. Here, in the conventional weathering steel for welding, the additive elements are limited for the purpose of suppressing welding cracks. More specifically, it is known that the corrosion resistance is improved by adding Cu or P, but since these elements cause welding cracks, generally, the addition amount of Cu is 0.3% by mass, and the addition amount of P is around 0.01% by mass.

In view of the above problems in the prior art, an object of the present invention is to provide a weathering steel for solid-state welding that forms an excellent weld when subjected to solid-state welding and has tensile properties equivalent or superior to those of high tensile strength steel, said steel having weathering properties superior to those of conventional weathering steel for welding, wherein the reliability of the weld is equivalent or superior to that of the parent material; and a weathering steel material for solid-state welding. Also an object of the present invention is to provide a solid-state welded structure that includes the weathering steel for solid-state welding according to the present invention, and a solid-state welding method for said weathering steel for solid-state welding.

Solution to Problem

In order to achieve the above object, the present inventors have conducted extensive studies as to the relationship between the composition of steel and weather resistance, and the relationship between the composition of steel and the mechanical properties of the parent material and solid-state welded portion, and as a result, based on carbon steel, it has been found that increasing of the amount of P added and the like are extremely effective, and then the present invention has been reached.

Namely, the present invention can provide
a weathering steel for solid-state welding having a steel composition which includes, in % by mass,
C: 0.10 to 0.60% and
P: more than 0.035 to 1.000%,
with the remainder consisting of Fe and unavoidable impurities.

The weathering steel for solid-state welding of the present invention is premised on welding by solid-state welding, but the method of the solid-state welding is not particularly limited as long as the effect of the present invention is not impaired, and various conventionally known methods of solid-state welding can be used.
Typical methods of solid-state welding include the friction stir welding, the friction welding and the linear friction welding.

In the weathering hot-rolled steel sheet for welded structures (GIS G3114) that guarantees weldability, the upper limit of the content of P is limited to 0.035%. However, it has been known that, when the content of P is up to about 0.5% by mass, the corrosion resistance (weather resistance) of steel is clearly improved by densification of protective rust, and the effect is increased up to about 1.0% by mass. The weathering steel for solid-state welding of the present invention is premised on the use of solid-state welding, and since it is not necessary to consider cracks due to melt welding, the content of P is more than 0.035 to 1.00% by mass. Here, the content of P is preferably 0.050 to 0.500% by mass, and more preferably 0.080 to 0.300% by mass.

Further, in the weathering steel for solid-state welding of the present invention, the content of C is 0.10 to 0.60% by mass in order to realize a tensile strength equivalent to that of the high-strength steel plate. When the content of C is increased, cracks are likely to occur during the welding, but by assuming the use of solid-state welding, a relatively large amount of C can be contained. Here, as long as the desired tensile strength can be obtained, the content of C is preferably small, the upper limit is more preferably 0.50% by mass, and most preferably 0.30% by mass. For example, although it depends on other additive elements and microstructure, a tensile strength of 490 MPa or more can be obtained by setting the carbon content to 0.30% by mass.

Further, it is preferable that the weathering steel for solid-state welding of the present invention further contains more than 0 to 3.00% by mass of Cu. By containing an appropriate amount of Cu, the protective rust is densified and the weather resistance (corrosion resistance) is improved. This effect is exhibited when even a small amount of Cu is added, but even if it is added in an amount of 3.00% by mass or more, no significant improvement is expected, and in addition thereto, since the parent material and the HAZ portion are cured, the upper limit value is 3.00% by mass. The amount of Cu added is preferably 0.10 to 2.00% by mass, more preferably 0.30 to 1.00% by mass.

Further, it is preferable that the weathering steel for solid-state welding of the present invention further contains Mn in an amount of more than 0 to 2.00% by mass. It is considered that by containing Mn, the formation of pro-eutectoid ferrite is suppressed and at the same time, the amount of solid-solution strengthening is increased. The more preferable content of Mn is 0.25 to 0.75% by mass.

Further, it is preferable that the weathering steel for solid-state welding of the present invention further contains Si in an amount of more than 0 to 1.00% by mass. By containing Si, it is possible to prevent the solid-state welded portion from being softened by heat, and it is expected to provide the effect of suppressing the formation of cementite, which lowers ductility. On the other hand, when setting to 1.00% or less, the decrease in toughness can be suppressed.

Further, it is preferable that the weathering steel for solid-state welding of the present invention further contains Cr in an amount of more than 0 to 2.00% by mass. By containing Cr in an amount of more than 0 to 2.00% by mass, preferably 0.50% to 2.00% by mass, the strength, ductility and toughness of the solid-state welded portion can be improved, and the weather resistance can be improved.

Further, it is preferable that the weathering steel for solid-state welding of the present invention further contains Ni in an amount of more than 0 to 3.00% by mass. By containing Ni in an amount of more than 0 to 3.00% by mass, the weather resistance of the weathering steel for solid-state welding can be further improved.

Further, it is preferable that the weathering steel for solid-state welding of the present invention further contains Mo in an amount of more than 0 to 1.00% by mass. By containing Mo in an amount of more than 0 to 1.00% by mass, the weather resistance of the weathering steel for solid-state welding can be further improved.

Further, it is preferable that the weathering steel for solid-state welding of the present invention further contains Ti in an amount of more than 0 to 0.03% by mass. By containing Ti in an amount of more than 0 to 0.03% by mass, the weathering resistance of the weathering steel for solid-state welding can be further improved.

Further, the present invention also provides a welded structure having a solid-state welded portion of the weathering steel for solid-state welding of the present invention, and is characterized in that the impact absorption energy of the solid-state welded portion is 90% or more of the impact absorption energy of the weathering steel for solid-state welding (parent material of the weathering steel for solid-state welding). The materials of the welded structure other than the weathering steel for solid-state welding, the shape and size of the structure, and the like are not particularly limited, and various conventionally known structures can be employed.

Since the weathering steel for solid-state welding of the present invention is used for the solid-state welded structure of the present invention, it has a better weathering resistance in comparison with the structure in which the conventional weathering hot-rolled steel sheet for welded structures is used. If necessary, the surface of the weathering steel for solid-state welding may be coated with a paint to improve corrosion resistance, but it may be uncoated depending on the usage environment.

Further, the impact absorption energy of the solid-state welded portion of the weathering steel for solid-state welding is 90% or more of the impact absorption energy of the parent material, and the solid-state welded structure of the present invention has extremely high reliability. The impact absorption energy of the solid-state welded portion is preferably 95% or more, more preferably 100% or more of the impact absorption energy of the parent material. Here, the method for measuring the impact absorption energy is not particularly limited as long as the effect of the present invention is not impaired, and various conventionally known measuring methods can be used, and for example, a micro-impact test may be performed on the micro test piece which is cut from the welded portion. In the stress-displacement curve obtained in the micro-impact test, the impact absorption energy can be calculated from the area of the region surrounded by the curve.

Further, the present invention also provides a weathering steel material for solid-state welding, which includes the weathering steel for solid-state welding of the present invention and characterized by having a mixed microstructure of ferrite and fine cementite. Since the weathering steel for solid-state welding of the present invention has the mixed microstructure of ferrite and fine cementite, it is possible to exhibit high strength and reliability in addition to excellent weather resistance. The mixed microstructure of ferrite and fine cementite can be obtained, for example, by subjecting the weathering steel for solid-state welding of the present invention to the friction stirring process at an $A_3$ point or less.

Furthermore, the present invention also provides a method of solid-state welding to the weathering steel material for solid-state welding comprising the weathering steel for solid-state welding of the present invention, characterized in that a welding temperature is set to an $A_3$ point determined by the chemical composition of the weathering steel for solid-state welding or less. Here, since the weathering steel for solid-state welding of the present invention contains a large amount of P, and P raises the $A_3$ point of the steel, it is easily performed the solid-state welding at the $A_3$ point or less as compared with a normal steel material.

In the weathering steel for solid-state welding of the present invention, a good joint without cracks can be obtained by using solid-state welding, but when the contents of C, P and Cu increase, there is a possibility that the toughness of the welded portion is decreased. On the other hand, by setting the welding temperature of the solid-state welding to the $A_3$ point determined by the chemical composition of the weathering steel for solid-state welding or less, the toughness of the solid-state welded portion can be improved and the impact absorption energy of the solid-state welded portion can be made higher than the impact absorption energy of the parent material.

Here, in the case that, even when the welding temperature of the solid-state welding is set to the $A_3$ point determined by the chemical composition of the weathering steel for solid-state welding or less, the impact absorption energy of the solid-state welded portion is less than 90% of the impact absorption energy of the parent material, it is preferable that the welding temperature is set to an $A_1$ point determined by the chemical composition of the weathering steel for solid-state welding or less. By setting the welding temperature to the $A_1$ point determined by the chemical composition of the weathering steel for solid-state welding or less, the impact absorption energy of the solid-state welded portion can be further increased.

Further, as the solid-state welding method of the present invention, it is preferable to employ any one of the friction stir welding, the friction welding and the linear solid-state welding. In the solid-state welding method of the present invention, it is necessary to control the welding temperature, but by using these solid-state welding methods, the welding temperature can be accurately determined. For example, in the friction stir welding, the welding temperature can be controlled by the shape, size and material of the tool, welding speed, welding load, tool rotation speed, and the like. Further, in the friction welding and the linear solid-state welding, the welding temperature can be controlled by the welding pressure applied to the interface to be welded.

Effect of the Invention

According to the present invention, it is possible to provide a weathering steel for solid-state welding that forms an excellent welded portion when subjected to solid-state welding and has tensile properties equivalent or superior to those of high tensile strength steel, the steel having weathering properties superior to those of conventional weathering steel for welding, wherein the reliability of the welded portion is equivalent or superior to that of the parent material; and a weathering steel material for solid-state welding. According to the present invention, it is also possible to provide a solid-state welded structure that includes the weathering steel for solid-state welding according to the present invention, and a solid-state welding method for the weathering steel for solid-state welding.

BRIEF DESCRIPTION OF THE DRAWINGS

FIG. 16 is a fractured surface of the micro-impact test pieces of the stir zone of the example steel 2 for solid-state welding and the example steel 3 for solid-state welding.

EMBODIMENTS FOR ACHIEVING THE INVENTION

Hereinafter, typical embodiments of the weathering steel for solid-state welding, the weathering steel material for solid-state welding, the solid-state welded structure, and the method of solid-state welding of the present invention will be described in detail, but the present invention is not limited thereto. In the following description, there is a case that duplicate description is omitted.

(1) Weathering Steel for Solid-State Welding

The weathering steel for solid-state welding of the present invention is a weathering steel for solid-state welding having a steel composition which includes, in % by mass, C: 0.10 to 0.60% and P: more than 0.035 to 1.000%, with the remainder consisting of Fe and unavoidable impurities.

A large amount of P and C is added in order to achieve weathering resistance significantly superior to that of the conventional hot-rolled steel sheet for welded structure and strength comparable to that of the high-strength steel. Further, in order to ensure welderbility, it is premised that solid-state welding is used. Hereinafter, each component will be described in detail.

1. Essential Additive Element

C: 0.10 to 0.60% by mass

By setting the carbon content to 0.10% by mass or more, the strengths of the steel and solid-state welded portion can be sufficiently improved, and by setting to 0.60% by mass or less, it is possible to suppress the decrease in toughness of the parent material and the stir zone. As long as the desired tensile strength can be obtained, the content of C is preferably small, the upper limit is more preferably 0.50% by mass, and most preferably 0.30% by mass. For example, although it depends on other additive elements and structure, a tensile strength of 490 MPa or more can be obtained by setting the carbon content to 0.30% by mass.

P: More than 0.035 to 1.000% by mass

Figure 1:
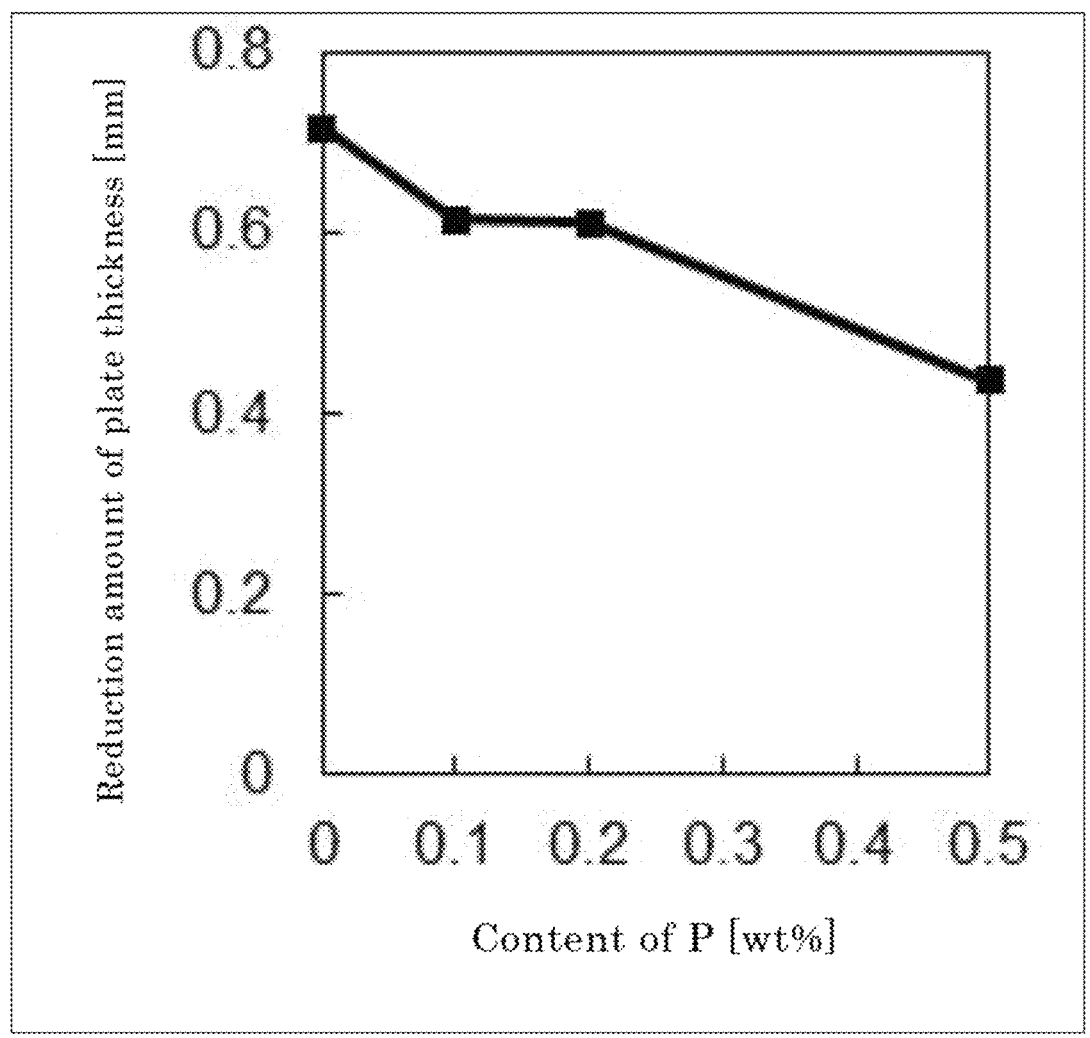
FIG. 1 is a graph which shows the relationship between the reduction amount of the plate thickness by corrosion and the content of P of the steel.

It has been known that, when the content of P is up to about 0.5% by mass, the corrosion resistance (weather resistance) of steel is clearly improved by densification of protective rust, and the effect is increased up to about 1.0% by mass. FIG. 1 shows the relationship between the reduction amount of the plate thickness by corrosion and the content of P of the steel (Tetsuya Hosaka: "Development of highly weathering steel and adaptation to unpainted bridges", Bridges and Foundations 6 (2002) 31-38). The weathering steel for solid-state welding of the present invention is premised on the use of solid-state welding, and since it is not necessary to consider cracks due to melt welding, the content of P is more than 0.035 to 1.00% by mass. Further, the addition of P can be expected to strengthen the solid solution of ferrite. Here, the content of P is preferably 0.050 to 0.500% by mass, and more preferably 0.080 to 0.300% by mass.

Figure 2:
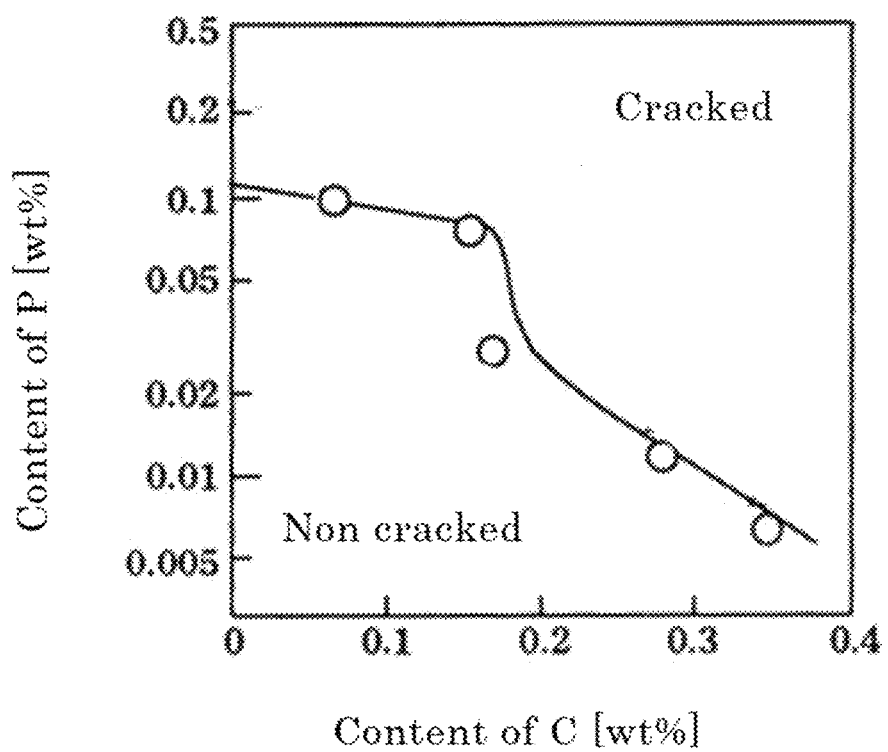
FIG. 2 is a graph which shows the relationship between the content of C and content of P and the occurrence of high temperature cracking by welding.

FIG. 2 shows the relationship as to the carbon steel between the content of C and content of P and the occurrence of high temperature cracking by welding (Ishiaki Tamaki: "Effect of carbon content and peritectic reaction on high temperature cracks of high carbon steel weld metal", Quarterly Journal of The Japan Welding Society, Vol. 20, No. 2, (2002), 266). The plots and solid line in the figure are the boundaries of crack occurrence, and the upper right region shows that cracks are generated by welding. According tp the present invention, a steel having a composition in which cracks are generated by welding is utilized as a weathering steel for solid-state welding.

2. Arbitrary Additive Element

Cu: More than 0 to 3.00% by mass

Figure 3:
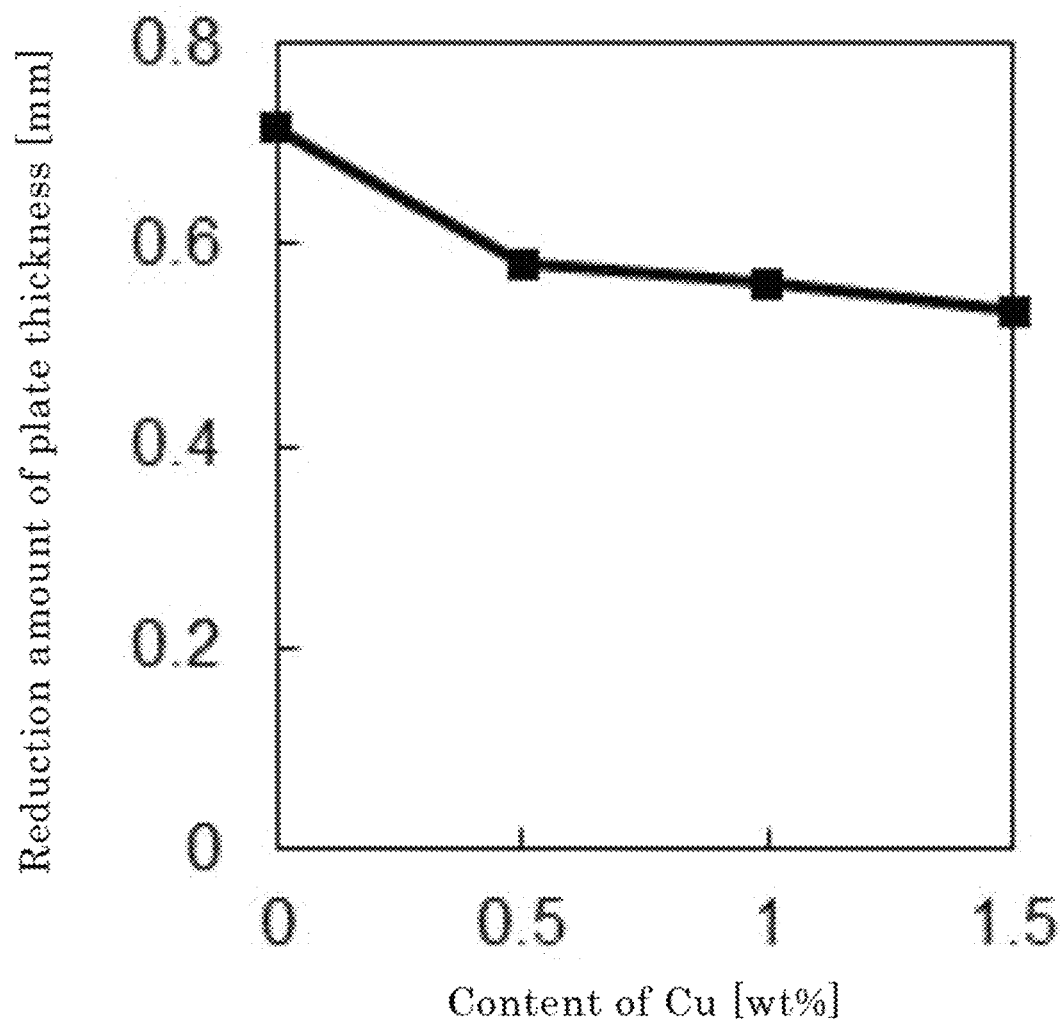
FIG. 3 is a graph which shows the relationship between the reduction amount of the plate thickness by corrosion and the content of Cu of the steel.

By containing an appropriate amount of Cu, the protective rust is densified and the weather resistance (corrosion resistance) is improved. FIG. 3 shows the relationship between the reduction amount of the plate thickness by corrosion and the content of Cu of the steel (Tetsuya Hosaka: "Development of highly weathering steel and adaptation to unpainted bridges", Bridges and Foundations 6 (2002) 31-38). This effect is exhibited when even a small amount of Cu is added, but even if it is added in an amount of 3.00% by mass or more, no significant improvement is expected, and in addition thereto, since the parent material and the HAZ portion are cured, the upper limit value is 3.00% by mass. The amount of Cu added is preferably 0.10 to 2.00% by mass, more preferably 0.30 to 1.00% by mass.

Mn: More than 0 to 2.00% by mass

It is considered that by containing Mn, the formation of pro-eutectoid ferrite is suppressed and at the same time, the amount of solid-solution strengthening is increased. The more preferable content of Mn is 0.25 to 0.75% by mass.

Si: More than 0 to 1.00% by mass

By containing Si, it is possible to prevent the solid-state welded portion from being softened by heat, and it is expected to provide the effect of suppressing the formation of cementite, which lowers ductility. On the other hand, when setting to 1.00% or less, the decrease in toughness can be suppressed.

Cr: More than 0 to 2.00% by mass

By containing Cr in an amount of more than 0 to 2.00% by mass, the strength and ductility of the solid-state welded portion can be enhanced, and the toughness can be improved. In particular, it has the effect of reducing the lamellar spacing of the pearlite structure and improving the strength. Further, since Cr forms a dense oxide film on the surface, the weather resistance is also improved.

Ni: 3.0% by mass or less

Though Ni is an element that improves the strength and toughness of the parent material, since when containing more than 3.0% by mass, the HAZ portion will harden, it is preferable to contain 3.0% by mass or less. Further, since Ni forms an extremely dense oxide film on the surface, the weather resistance is improved even in a beach environment where salt is flying. However, since Ni is expensive, it is preferably 3.0% by mass or less.

Mo: 1.0% by mass or less

Though Mo is an element useful for improving the strength of the parent material, since when containing more than 1.0% by mass, it adversely affects the toughness, it is preferably 1.0% by mass or less. In addition, Mo forms an extremely dense oxide film on the surface and further repairs the oxide film. Particularly, the weather resistance is improved even in a beach environment where salt is flying. Further, since Mo is expensive, it is preferably 1.0% by mass or less.

Ti: 0.03% by mass or less

Ti is preferably added in an amount of about 0.02% by mass, because of stabilizing the oxide film formed on the surface by adding a very small amount to improve weather resistance.

B: 0.0040% by mass or less

B has the effect of segregating at the grain boundaries to improve the grain boundary strength. This effect is remarkable when P, which makes the grain boundaries brittle, is added as in the present invention. However, when more than 0.0040% by mass, the deterioration of toughness is generated, it is preferably 0.0040% by mass or less.

In addition, there is N as an impurity, and since when containing in a large amount, a nitride is formed and the toughness is lowered, the amount of N to be mixed is preferably 0.010% by mass or less.

(2) Solid-State Welded Structure

Figure 4:
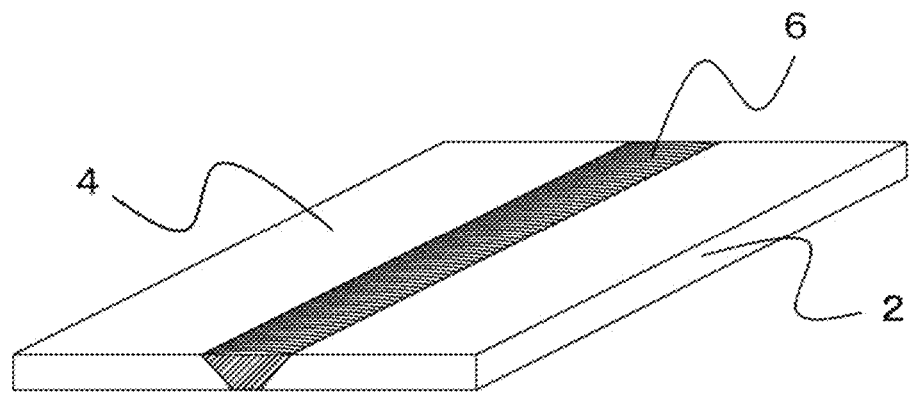
FIG. 4 is a schematic diagram of the solid-state welded joint having the solid-state welded portion formed by the friction stir welding.
Figure 4:
Figure 5:
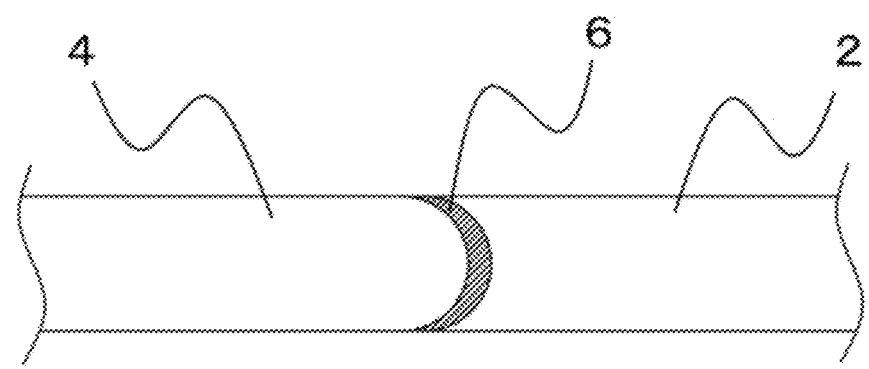
FIG. 5 is a schematic diagram of the solid-state welded joint having the solid-state welded portion formed by the friction welding.
Figure 5:
Figure 6:
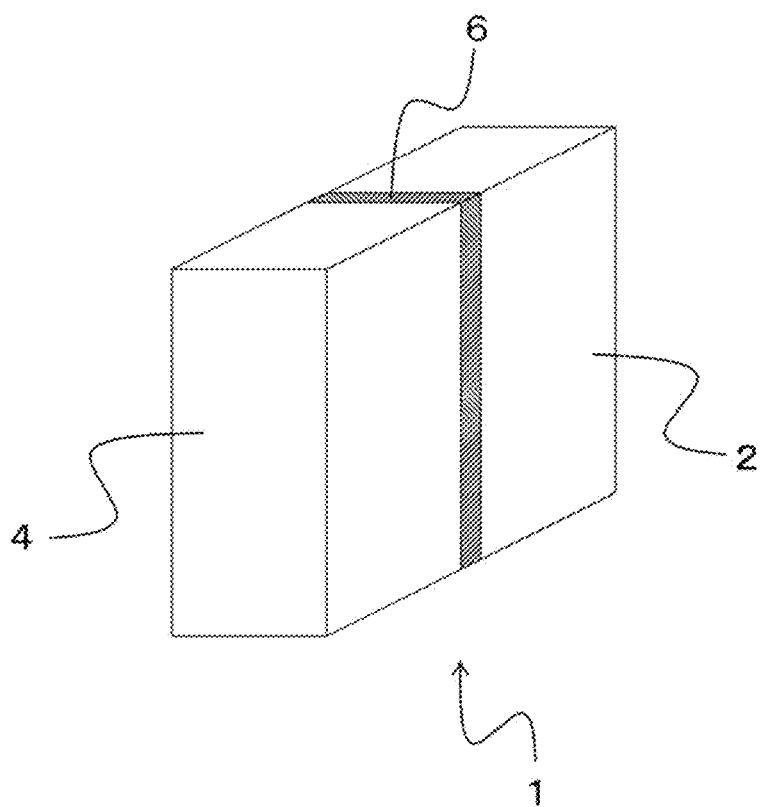
FIG. 6 is a schematic diagram of the solid-state welded joint having the solid-state welded portion formed by the linear friction welding.

The solid-state welded structure of the present invention is characterized by having the solid-state welding joint 1 shown in FIG. 4 to FIG. 6. Here, one embodiment of the solid-state welded joint formed by the friction stir welding is shown in FIG. 4, one embodiment of the solid-state welded joint formed by the friction welding is shown in FIG. 5, and one embodiment of the solid-state welded joint formed by the linear friction welding is shown in FIG. 6, respectively. The materials of the structures other than the solid-state welded joint 1, the shape and size of the structure are not particularly limited, and various conventionally known structures can be employed.

The friction stir welding includes the following (1) to (4) embodiment or combination thereof, that is, (1) the welding where the ends of the metal plates are butted against each other to form a portion to be welded, and the rotating tool is moved along the longitudinal direction of the portion to be processed while rotating to weld the metal plates with each other, (2) the spot welding where the ends of the metal plates are butted against each other to form a portion to be welded, and the rotation tool is rotated and welded without moving at the portion to be welded, (3) the spot welding where the metal plates are overlapped at a portion to be welded, the rotating tool is inserted to the portion to be welded and the rotating tool is rotated at that point without moving to weld the metal plates, and (4) the welding where the metal plates are overlapped at a portion to be welded, the rotating tool is inserted to the portion to be welded and the rotating tool is moved along the longitudinal direction of the portion to be processed while rotating to weld the metal plates with each other.

In the solid-state welded joint 1 of the present invention, at least one of the materials to be welded (2, 4) is the weathering steel material for solid-state welding made of the weathering steel for solid-state welding of the present invention. Further, the impact absorption energy of the solid-state welded portion 6 is 90% or more of the impact absorption energy of the material to be welded (2, 4) made of the weathering steel for solid-state welding. When the impact absorption energy of the solid-state welded portion 6 is 90% or more of the impact absorption energy of the material to be welded (2, 4) made of the weathering steel for solid-state welding, it is possible to endow the solid-state welded structure with high reliability, and for example, it can be suitably used as structures that require high long-term reliability such as bridges or an offshore structures. The impact absorption energy of the solid-state welded portion 6 is preferably 95% or more, more preferably 100% or more of the impact absorption energy of the material to be welded (2, 4).

The method for measuring the impact absorption energy is not particularly limited as long as the effect of the present invention is not impaired, and various conventionally known measuring methods can be used, and for example, a micro-impact test may be performed on the micro test piece which is cut from the welded portion.

Figure 7:
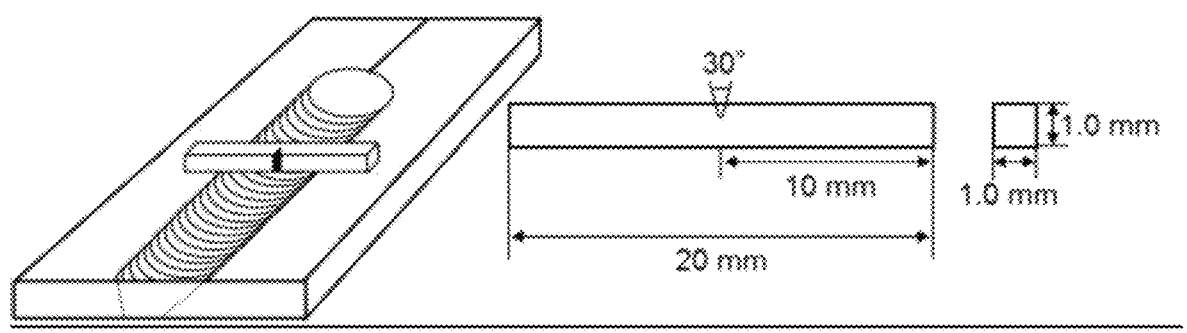
FIG. 7 is a schematic diagram which shows the shape and size of the micro-impact test piece.

FIG. 7 shows a schematic diagram of collecting test pieces when the solid-state welded portion 6 is formed by the friction stir welding. A notch is formed at a portion corresponding to the solid-state welded portion 6, and the impact absorption energy in the region can be obtained.

(3) Weathering Steel Material for Solid-State Welding

The weathering steel material for solid-state welding of the present invention includes the weathering steel for solid-state welding of the present invention and characterized by having a mixed microstructure of ferrite and fine cementite. Since the weathering steel for solid-state welding of the present invention has the mixed microstructure of ferrite and fine cementite, it is possible to exhibit high strength and reliability in addition to excellent weather resistance. The mixed microstructure of ferrite and fine cementite can be obtained, for example, by subjecting the weathering steel for solid-state welding of the present invention to the friction stirring process at an $A_3$ point or less.

(4) Method of Solid-State Welding

The method of solid-state welding of the present invention is the method of solid-state welding, in which the above-mentioned weathering steel for solid-state welding of the present invention is used as the material to be welded (2, 4), and characterized in that a welding temperature is set to an $A_3$ point determined by the chemical composition of the weathering steel for solid-state welding or less. Here, since the weathering steel for solid-state welding of the present invention has a large content of P and, as a result, the $A_3$ point rises, and then the solid-state welding can be easily performed at the $A_3$ point or less. More specifically, when calculating by using integrated thermodynamic calculation software (Thermo-calc), when the content of C is 0.3% by mass, by setting the content of P is 0.1% by mass to 0.5% by mass, the $A_3$ point can be raised by 100° C.

By setting the welding temperature of the solid-state welding to the $A_3$ point determined by the chemical composition of the weathering steel for solid-state welding or less, the toughness of the solid-state welded portion 6 can be improved and the impact absorption energy of the solid-state welded portion 6 can be made higher than the impact absorption energy of the material to be welded (2,4).

Here, in the case that, even when the welding temperature of the solid-state welding is set to the $A_3$ point determined by the chemical composition of the weathering steel for solid-state welding or less, the impact absorption energy of the solid-state welded portion 6 is less than 90% of the impact absorption energy of the material to be welded (2,4), it is preferable that the welding temperature is set to an $A_1$ point determined by the chemical composition of the weathering steel for solid-state welding or less. By setting the welding temperature to the $A_1$ point determined by the chemical composition of the weathering steel for solid-state welding or less, the impact absorption energy of the solid-state welded portion 6 can be further increased.

Further, as the solid-state welding method of the present invention, it is preferable to employ any one of the friction stir welding, the friction welding and the linear friction welding. In the method of solid-state welding of the present invention, it is necessary to control the welding temperature, but by using these solid-state welding methods, the welding temperature can be accurately determined. For example, in the friction stir welding, the welding temperature can be controlled by the shape, size and material of the tool, welding speed, welding load, tool rotation speed, and the like. Further, in the friction welding and the linear solid-state welding, the welding temperature can be controlled by the welding pressure applied to the interface to be welded.

More specifically, in the friction stir welding, the welding temperature can be lowered by using a tool material having a low affinity with the material to be welded, increasing the welding speed, reducing the welding load and rotation speed of the tool, and in the friction welding and linear solid-state welding, the welding temperature can be lowered by increasing the welding pressure applied to the interface to be welded. It is also possible to lower the welding temperature by using external cooling with liquid $CO_2$, liquid nitrogen, water and various gases.

In the above, though the typical embodiments of the present invention have been described, the present invention is not limited to these, and various design changes are possible, and all of these design changes are included in the technical scope of the present invention.

In the following, the weathering steel for solid-state welding, the weathering steel material for solid-state welding, the solid-state welded structure, and the method of solid-state welding according to the present invention will be further described in Examples, but the present invention is limited to these Examples.

EXAMPLE

Example 1

A steel ingot (φ35×20 to 25 h) having the composition shown in Table 1 was prepared by high-frequency melting, and a steel plate with a thickness of 3 mm (example weathering steel material 1 for solid-state welding) was obtained by hot-rolling at 900° C. The steel plate after the hot-rolling was held at 900° C. for 10 minutes and then air-cooled (normalizing treatment). The values shown in Table 1 are % by mass.

TABLE 1

|  | C | Si | Mn | Cr | Cu | P | Fe |
|---|---|---|---|---|---|---|---|
| Ex. 1 | 0.10 | 0.46 | 0.39 | 0.63 | 0.28 | 0.097 | Bal. |
| Ex. 2 | 0.27 | 0.48 | 0.13 | 0.42 | 0.49 | 0.092 | Bal. |
| Ex. 3 | 0.24 | 0.51 | 0.10 | 0.41 | 0.48 | 0.079 | Bal. |
| Ex. 4 | 0.32 | 0.49 | 0.06 | 0.39 | 0.48 | 0.062 | Bal. |

A cemented carbide tool (the probe does not have a screw) having a shape of a shoulder diameter of 15 mm, a probe diameter of 6 mm, and a probe length of 2.9 mm was used for the obtained steel sheet, and the friction stir welding was performed under the conditions of the tool rotation speed: 400 rpm, welding speed: 150 mm/min, welding load: 2.5 ton, tool advance angle: 3°, and welding atmosphere: Ar.

Example 2

A steel plate (example steel 2 for solid-state welding) was obtained in the same manner as in Example 1 except that the composition of Example 2 shown in Table 1 was used. Further, the friction stir welding was performed in the same manner as in Example 1. In addition, for comparison, the TIG welding was performed under the conditions of welding current: 130 A and welding speed: 300 mm/min.

Example 3

A steel plate (example steel 2 for solid-state welding) was obtained in the same manner as in Example 1 except that the composition of Example 3 shown in Table 1 was used. Further, the friction stir welding was performed in the same manner as in Example 1 except that the tool rotation speed was 100 rpm and the welding speed was 100 mm/min.

Example 4

A steel plate (example steel 4 for solid-state welding) was obtained in the same manner as in Example 1 except that the composition of Example 4 shown in Table 1 was used and a tempering treatment (preservation at 500° C. for 30 minutes and then quenching) was added after the normalizing treatment. Further, the friction stir welding was performed in the same manner as in Example 3.

Example 5

A steel ingot (φ35×20 to 25 h) having the composition of Example 5 shown in Table 2 was prepared by high-frequency melting, and a steel plate with a thickness of 3 mm (example steel 5 for solid-state welding) was obtained by hot-rolling at 1000° C. The steel plate after the hot-rolling was held at 1000° C. for 10 minutes and then air-cooled (normalizing treatment). The values shown in Table 2 are % by mass.

TABLE 2

|  | C | Si | Mn | Cr | Cu | Ni | P | Fe |
|---|---|---|---|---|---|---|---|---|
| Ex. 5 | 0.10 | 0.50 | 0.10 | 0.40 | 0.50 | <0.02 | 0.100 | Bal. |
| Ex. 6 | 0.10 | 0.50 | 0.10 | 0.40 | 0.50 | <0.02 | 0.300 | Bal. |
| Ex. 7 | 0.30 | 0.50 | 0.10 | 0.40 | 0.50 | <0.02 | 0.100 | Bal. |
| Ex. 8 | 0.30 | 0.50 | 0.10 | 0.40 | 0.50 | <0.02 | 0.200 | Bal. |
| Ex. 9 | 0.30 | 0.50 | 0.10 | 0.40 | 0.50 | <0.02 | 0.300 | Bal. |
| Ex. 10 | 0.30 | 0.50 | 0.10 | 0.40 | 0.50 | <0.02 | 0.450 | Bal. |

A cemented carbide tool (the probe does not have a screw) having a shape of a shoulder diameter of 15 mm, a probe diameter of 6 mm, and a probe length of 2.9 mm was used for the obtained steel sheet, and the friction stir welding was performed under the conditions of tool advance angle: 3°, and welding atmosphere: Ar. Here, the high-temperature welding condition where the welding temperature is more than the $A_3$ point of the steel material was the tool rotation speed: 400 rpm and the welding speed: 150 mm/min, and the welding load was such adjusted that the shoulder came into contact with the surface of the steel plate and appropriate frictional heat was generated. Further, the low-temperature welding condition where the welding temperature is the $A_1$ point of the steel material or less was the tool rotation speed: 80 rpm and the welding speed: 150 mm/min, and the welding load was such adjusted that the shoulder came into contact with the surface of the steel plate and appropriate frictional heat was generated.

Example 6

A steel plate (example steel 6 for solid-state welding) was obtained in the same manner as in Example 5 except that the composition of Example 6 shown in Table 2 was used. Further, the friction stir welding was performed in the same manner as in Example 5.

Example 7

A steel plate (example steel 7 for solid-state welding) was obtained in the same manner as in Example 5 except that the composition of Example 7 shown in Table 2 was used, the hot rolling temperature was set to 950° C. and the subsequent holding temperature was set to 900° C. A cemented carbide tool (the probe does not have a screw) having a shape of a shoulder diameter of 15 mm, a probe diameter of 6 mm, and a probe length of 2.9 mm was used for the obtained steel sheet, and the friction stir welding was performed under the conditions of tool advance angle: 3°, and welding atmosphere: Ar. Here, the high-temperature welding condition where the welding temperature is more than the $A_3$ point of the steel material was the tool rotation speed: 400 rpm and the welding speed: 150 mm/min, and the welding load was such adjusted that the shoulder came into contact with the surface of the steel plate and appropriate frictional heat was generated. Further, the low-temperature welding condition where the welding temperature is in the two-phase range of ferrite and austenite was the tool rotation speed: 100 rpm and the welding speed: 100 mm/min, and the welding load was such adjusted that the shoulder came into contact with the surface of the steel plate and appropriate frictional heat was generated.

Example 8

A steel plate (example steel 8 for solid-state welding) was obtained in the same manner as in Example 7 except that the composition of Example 8 shown in Table 2 was used. Further, the friction stir welding was performed in the same manner as in Example 7.

Example 9

A steel plate (example steel 9 for solid-state welding) was obtained in the same manner as in Example 7 except that the composition of Example 9 shown in Table 2 was used. Further, the friction stir welding was performed in the same manner as in Example 7.

Example 10

A steel plate (example steel 10 for solid-state welding) was obtained in the same manner as in Example 7 except that the composition of Example 10 shown in Table 2 was used. Further, the friction stir welding was performed in the same manner as in Example 7.

Comparative Example 1

As the test material, SMA490AW which is an existing weathering steel standardized by JIS was used. The SMA490AW has the composition shown as Comparative Example 1 in Table 3, but the addition of C and P is suppressed. The values shown in Table 3 are % by mass. Further, the friction stir welding was performed by using the same welding conditions as in Example 7.

TABLE 3

| | C | Si | Mn | Cr | Cu | Ni | P | Fe |
|---|---|---|---|---|---|---|---|---|
| Com. Ex. 1 | 0.12 | 0.20 | 1.14 | 0.48 | 0.32 | 0.10 | 0.012 | Bal. |
| Com. Ex. 2 | 0.08 | 0.43 | 0.38 | 0.67 | 0.31 | 0.18 | 0.094 | Bal. |
| Com. Ex. 3 | 0.30 | 0.50 | 0.10 | 0.40 | 0.50 | <0.02 | <0.01 | Bal. |

Comparative Example 2

As the test material, SPA-H which is an existing weathering steel standardized by JIS was used. The SPA-H has the composition shown as Comparative Example 2 in Table 3, but the addition of C and P is suppressed. Further, the friction stir welding was performed by using the same welding conditions as in Example 7.

Comparative Example 3

A steel plate (comparison steel 3 for solid-state welding) was obtained in the same manner as in Example 5 except that the composition of Comparative Example 3 shown in Table 3 was used, the hot-rolling temperature was set to 950° C. and the subsequent holding temperature was set to 900° C. The comparative steel 3 for solid-state welding contains 0.3% by mass of C, while the addition of P is suppressed. Further, the friction stir welding was performed by using the same welding conditions as in Example 7.

[Evaluation Test]
(1) Microstructure Observation

After cutting out the area including the stir zone perpendicular to the friction stir welding direction, and polishing and corroding (4% Nital) the cross section, the structure was observed with an optical microscope. Emery paper (#600 to #3000) and diamond paste (particle size 3 μm and 1 μm) were used for polishing. A sample for observing the parent material was also prepared in the same manner. In addition, the fine structure was observed in more detail by using a scanning electron microscope (SEM, JEOL JSM-7001FA). The distribution of P and C was evaluated by using an electron probe macro analyzer (EPMA).

(2) Measurement of Vickers Hardness

A cross-section sample was prepared in the same manner as in (1), and the horizontal distribution of Vickers hardness in the vicinity of the stir zone was measured. The measurement was performed by using a micro-hardness meter FM-300 (available from Future Tech Co., Ltd.) with a measurement load of 100 gf and a holding time of 15 s.

(3) Micro-Impact Test

The fracture toughness of the parent material and the welded portion was evaluated by calculating the absorbed energy through the micro-impact test. The micro-impact test pieces shown in FIG. 7 were cut out from the parent material and the friction stir welded portion. The notch of the test piece was set to the center of the stirring region, and the dimensions of the test piece were length: 20 mm, thickness: 0.5 mm, width: 0.5 mm, and notch: 0.1 mm. The measurement was performed at room temperature with the puncher speed of 1 m/s, and the absorbed energy was calculated by integrating the obtained load displacement curve.

Figure 8:
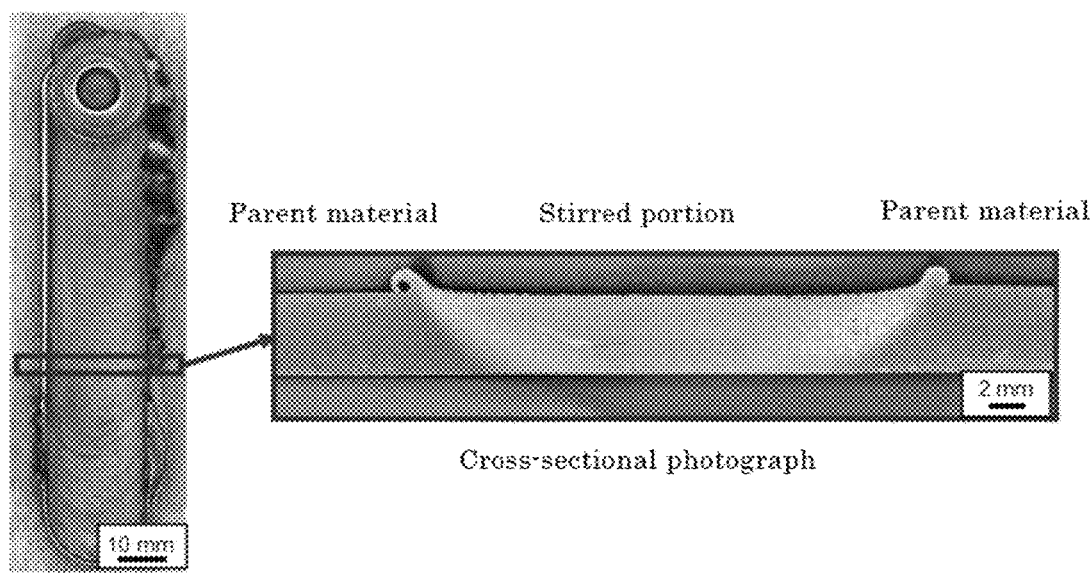
FIG. 8 is a surface appearance photograph and a cross-sectional photograph of the example steel 2 for solid-state welding which is subjected to the friction stir welding.

FIG. 8 shows a photograph of the surface appearance and a photograph of a cross section of the example steel 2 for solid-state welding, which was subjected to the friction stir welding in Example 2. It is clear that no defect such as crack was observed on the surface and the cross section, and that a good stir zone (solid-state welded portion) was formed.

Figure 9:
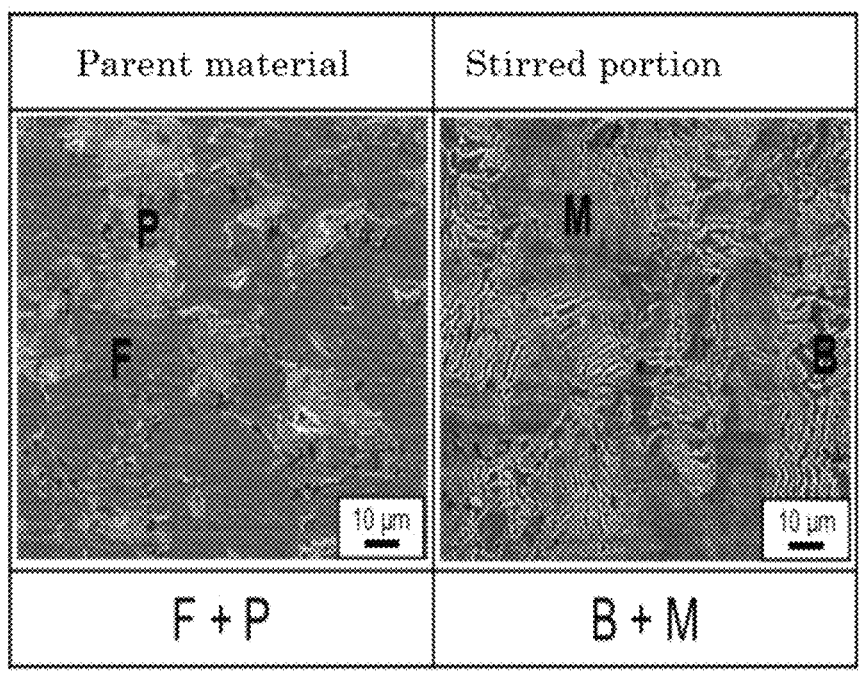
FIG. 9 is a photograph of the microstructure of the parent material and the stir zone of the example steel 2 for solid-state welding.
Figure 10:
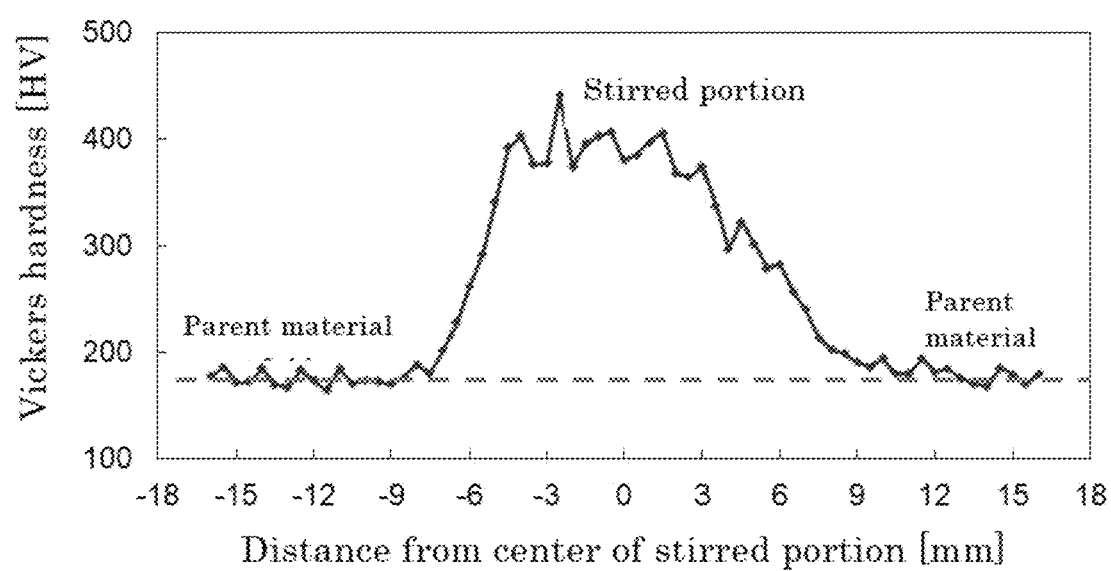
FIG. 10 is a horizontal distribution of Vickers hardness in the vicinity of the stir zone of the example steel 2 for solid-state welding.

FIG. 9 shows the photograph of the structure of the parent material and the stir zone of the steel 2 for solid-state welding. The parent material has a structure composed of ferrite and pearlite, and the stir zone has a structure composed of bainite and martensite. The result shows that the welding temperature of the friction stir welding in Example 2 was higher than that at the $A_3$ point. The horizontal distribution of Vickers hardness in the vicinity of the stir zone is shown in FIG. 10, and the hardness of the stir zone is higher than that of the parent material due to the formation of the transformed structure. The hardness of the parent material is about 180 HV, which means that the parent material has a tensile strength of about 540 MPa.

When the impact absorption energy was obtained from the area of the load displacement curve obtained in the micro-impact test, the parent material of the example steel 2 for solid-state welding was 30.7 N·mm and the stir zone was 6.7 N·mm. The impact absorption energy of the parent material of the example steel 2 for solid-state welding is about the same as the impact absorption energy of the weathering hot-rolled steel plate for welded structure that guarantees weldability, and even though a relatively large amount of C and P is contained, toughness is good. In addition, the stir zone also maintains a certain amount of impact absorption energy, but the value is lower than that of the parent material.

Figure 11:
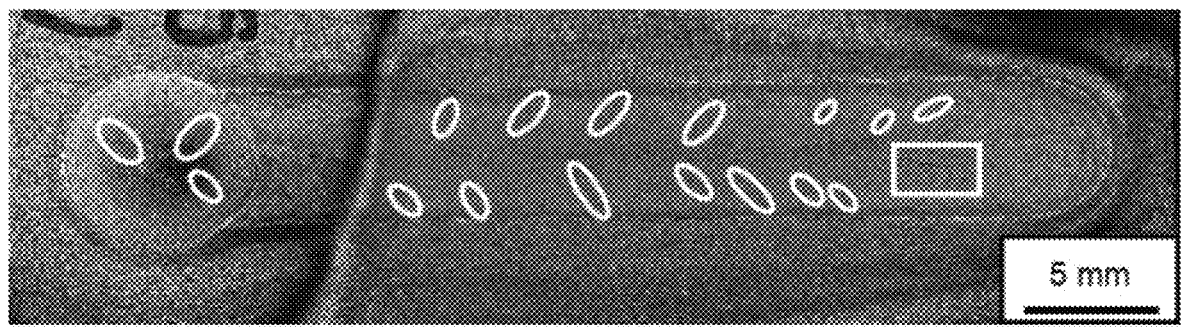
FIG. 11 is a surface appearance photograph of the example steel 2 for solid-state welding which is subjected to the TIG welding in Example 2.
Figure 12:
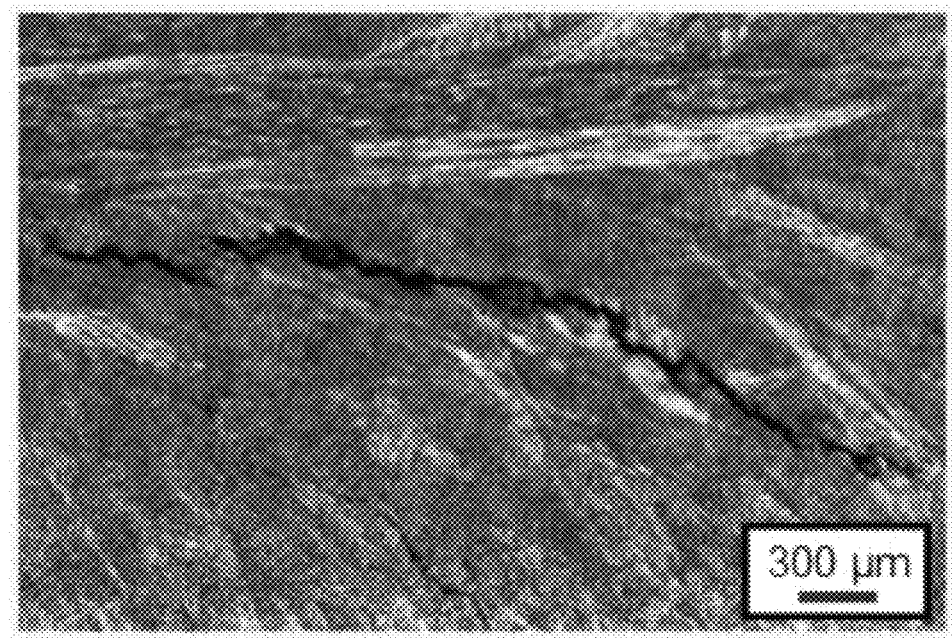
FIG. 12 is an enlarged photograph of FIG. 11.

FIG. 11 shows a surface appearance photograph of the example steel 2 for solid-state welding, which was subjected to the TIG welding in Example 2, and cracks are generated in the regions surrounded by circles and a square. An enlarged photograph of the area surrounded by the square is shown in FIG. 12.

Figure 13:
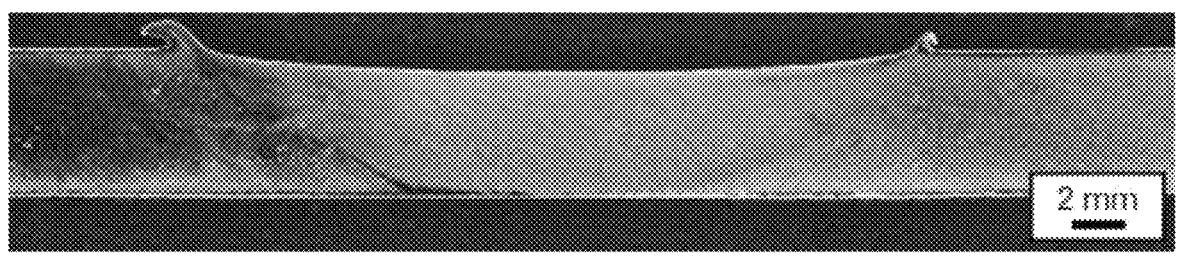
FIG. 13 is a cross-sectional photograph of the example steel 3 for solid-state welding which is subjected to the friction stir welding.

FIG. 13 shows a cross-sectional photograph of the example steel 3 for solid-state welding, which was subjected to the friction stir welding in Example 3.

It can be seen that even if the welding temperature is lowered, a good stir zone (solid-state welded portion) without defects is formed.

Figure 14:
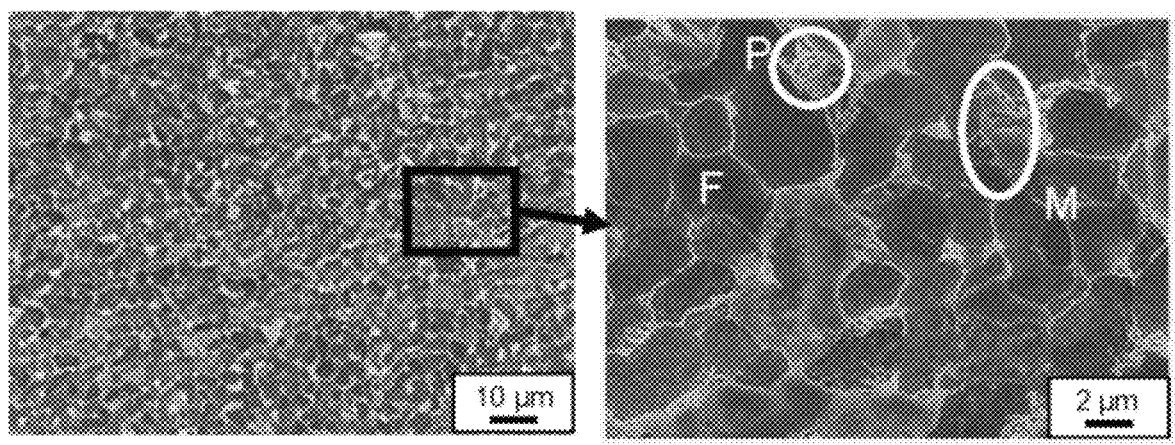
FIG. 14 is a photograph of the microstructure of the stir zone of the example steel 3 for solid-state welding.

FIG. 14 shows a microstructure photograph of the stir zone of the example steel 3 for solid-state welding. The structure is composed of fine ferrite and pearlite containing a small amount of martensite, and the result means that the maximum temperature reached by the friction stir welding is the $A_3$ point or less (two-phase region of ferrite and austenite).

Figure 15:
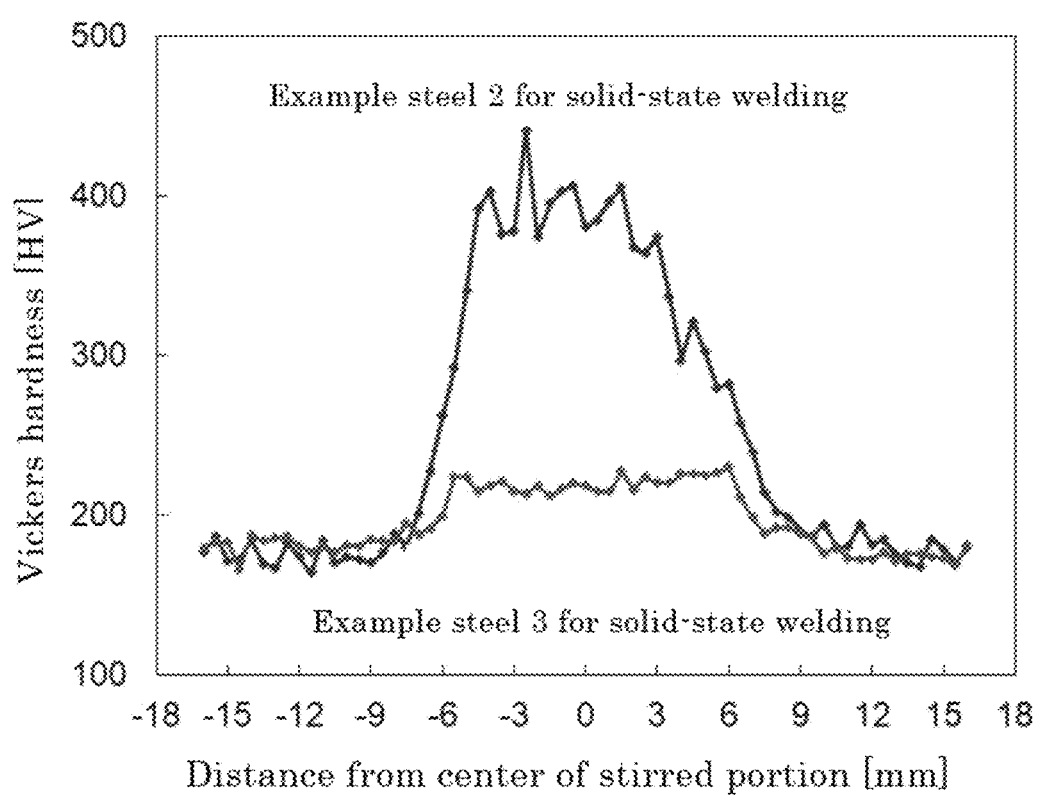
FIG. 15 is a horizontal distribution of Vickers hardness in the vicinity of the stir zone of the example steel 3 for solid-state welding.

FIG. 15 shows a horizontal distribution of Vickers hardness in the vicinity of the stir zone of the example steel 3 for solid-state welding (for comparison, the Vickers hardness in the vicinity of the stir zone of the example steel 2 for solid-state welding is also shown). The increase in hardness of the stir zone of the example steel 3 for solid-state welding is smaller due to the suppression of the formation of the transformed structure, and is lower than that of the stir zone of the example steel 2 for solid-state welding. Further, the impact absorption energy of the stir zone of the example steel 3 for solid-state welding is 36.0 N·mm, and even when the contents of C and P are large, it can be seen that the impact absorption energy higher than that of the parent material can be obtained by performing the solid-state welding at the $A_3$ point or less. The impact absorption energy of the parent material of the example steel 3 for solid-state welding was about 30 N·mm, which was the same as in the case of the example steel 2 for solid-state welding.

FIG. 16 shows the fracture surface of the micro-impact test piece of the stir zone of the example steel 2 for solid-state welding and the example steel 3 for solid-state welding. With respect to the example steel 2 for solid-state welding where the welding temperature of the friction stir welding was higher than the point $A_3$ was brittle fracture, but the example steel 3 for solid-state welding, where the welding temperature was the $A_3$ point or less, ductile fracture was generated.

Figure 17:
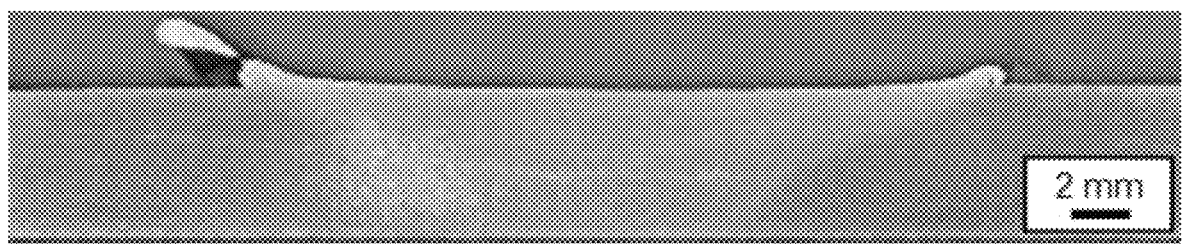
FIG. 17 is a cross-sectional photograph of the example steel 1 for solid-state welding which is subjected to the friction stir welding in Example 1.

FIG. 17 shows a photograph of a cross section of the example steel 1 for solid-state welding, which was subjected to the friction stir welding in Example 1. It is clear that no defect such as crack was observed, and that a good stir zone (solid-state welded portion) was formed. Further, when the impact absorption energy was obtained from the area of the load displacement curve obtained in the micro-impact test, the parent material of the example steel 1 for solid-state welding was 33.1 N·mm and the stir zone was 35.7 N·mm. In case that the contents of C and P and the like are relatively small, the impact absorption energy of the welded portion can be set to be equal to or higher than that of the parent material even if the solid-state welding temperature is higher than the $A_3$ point.

With respect to the example steel 4 for solid-state welding which was subjected to the friction stir welding in Example 4, the impact absorption energy of the parent material was 19.4 N·mm, and the impact absorption energy of the stir zone was 36.0 N·mm. Even when the impact absorption energy of the parent material is lowered by the tempering treatment, high impact absorption energy can be imparted to the solid-state welded portion by setting the solid-state welding temperature to the $A_3$ point or less.

Figure 18:
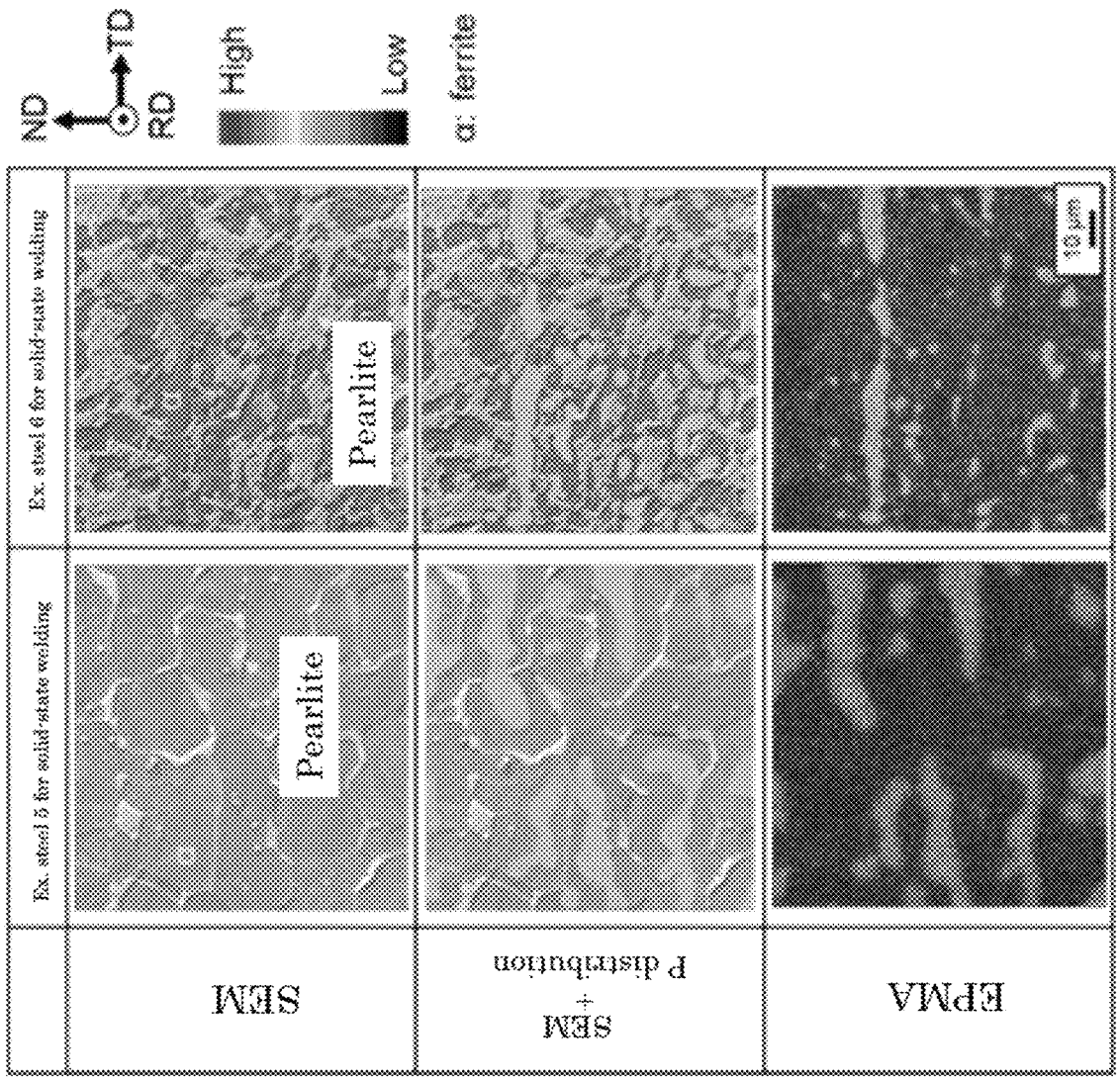
FIG. 18 is the SEM images, the EPMA maps of P, and the SEM images in which the P segregation part is superimposed as to the example steel 5 for solid-state welding and the example steel 6 for solid-state welding.

FIG. 18 shows SEM images of the example steel 5 for solid-state welding and the example steel 6 for solid-state welding, an EPMA map of P, and an SEM image in which the P segregation portion is superimposed. The parent material microstructures of the example steel 5 for solid-state welding and the example steel 6 for solid-state welding are both composed of ferrite and pearlite. The example steel 5 for solid-state welding also has a layered P segregation portion extending in the TD direction similar to the example steel 6 for solid-state welding. Therefore, it is considered that the P segregation portion in the parent material of the example steel 5 for solid-state welding was formed by being stretched by rolling the segregation portion generated by solidification and segregation while maintaining at a temperature of the A₃ point or higher during the hot-rolling, as in the example steel 6 for solid-state welding. It can be seen that the P concentration of the segregated portion of the example steel 5 for solid-state welding is lower.

Figure 19:
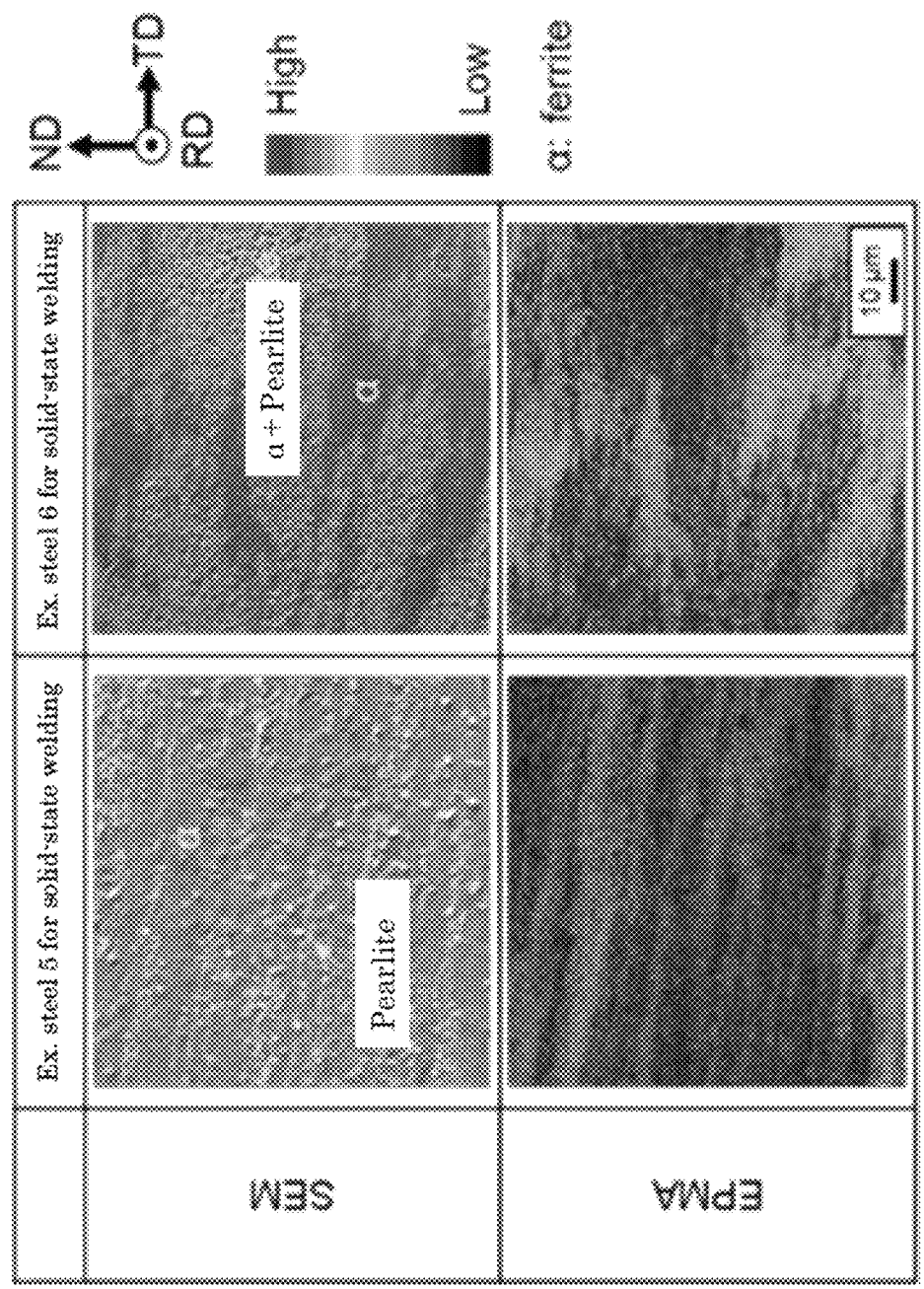
FIG. 19 is the SEM images of the stir zone formed in the two-phase region of ferrite and austenite, and the EPMA maps of P as to the example steel 5 for solid-state welding and the example steel 6 for solid-state welding.

FIG. 19 shows the SEM images of the stir zone formed in the two-phase region of ferrite and austenite, and the EPMA maps of P as to the example steel 5 for solid-state welding and the example steel 6 for solid-state welding. In the example steel 5 for solid-state welding and the example steel 6 for solid-state welding, the stir zones are both the structure mainly composed of ferrite and pearlite. Further, it can be seen that in any of the stir zones, P is dispersed in the ferrite due to the stirring effect of the friction stir welding and is homogenized as compared with the parent material.

Figure 20:
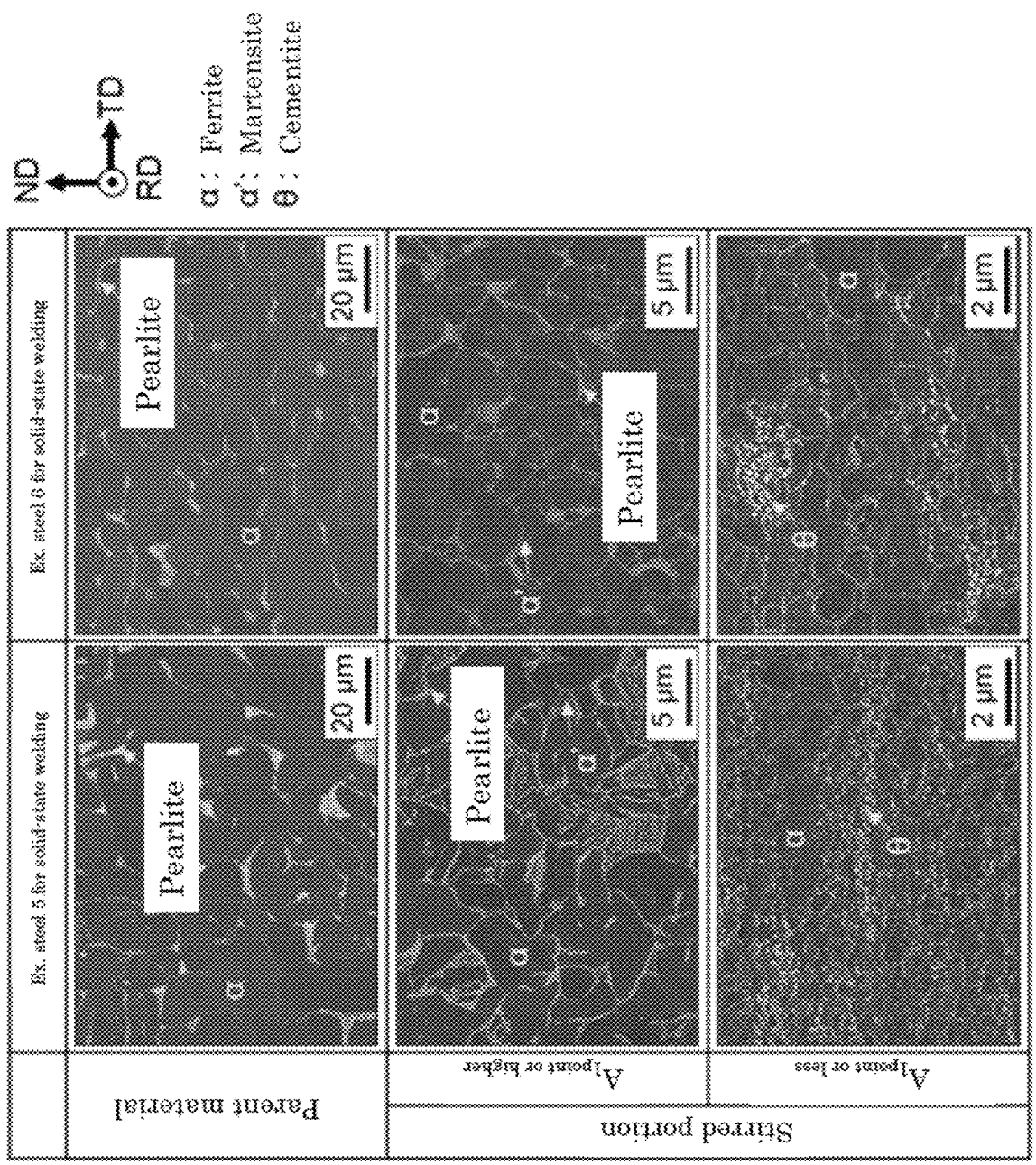
FIG. 20 is the SEM images of the parent material and the stir zone of the example steel 5 for solid-state welding and the example steel 6 for solid-state welding.

FIG. 20 shows the SEM images of the parent material and the stir zone of the example steel 5 for solid-state welding and the example steel 6 for solid-state welding. Regarding the parent material, the crystal grain size of the ferrite is 48.6 µm for the example steel 5 for solid-state welding and 23.3 µm for the example steel 6 for solid-state welding, and the crystal grain size is significantly reduced by increasing the amount of P added. It is considered that this fact is caused by that the moving speed of the transformed interface and the growth rate of the ferrite are decreased due to the solution drag effect by the increase in the amount of P added. The pearlite fraction was 8.3% for the example steel 5 for solid-state welding and 3.6% for the example steel 6 for solid-state welding, which decreases with the addition of P.

Regarding the stir zone formed at the welding temperature of the A₃ point or higher, both the example steel 5 for solid-state welding and the example steel 6 for solid-state welding are the microstructure which is composed of mainly ferrite (a) and pearlite, and partially mixed martensite. The crystal grain size of the ferrite is 11.7 µm for the example steel 5 for solid-state welding and 7.3 µm for the example steel 6 for solid-state welding, and the example steel 6 for solid-state welding is slightly finer. Regarding the stir zone at the A₁ point or less, both the example steel 5 for solid-state welding and the example steel 6 for solid-state welding are the microstructure which is composed of ferrite (a) and spherical cementite (θ). The crystal grain size of the ferrite is 1.37 µm for the example steel 5 for solid-state welding and 2.47 µm for the example steel 6 for solid-state welding, and the grain size of the example steel 5 for solid-state welding is slightly finer due to significant refinement by the friction stir welding at the A₁ point or less.

Figure 21:
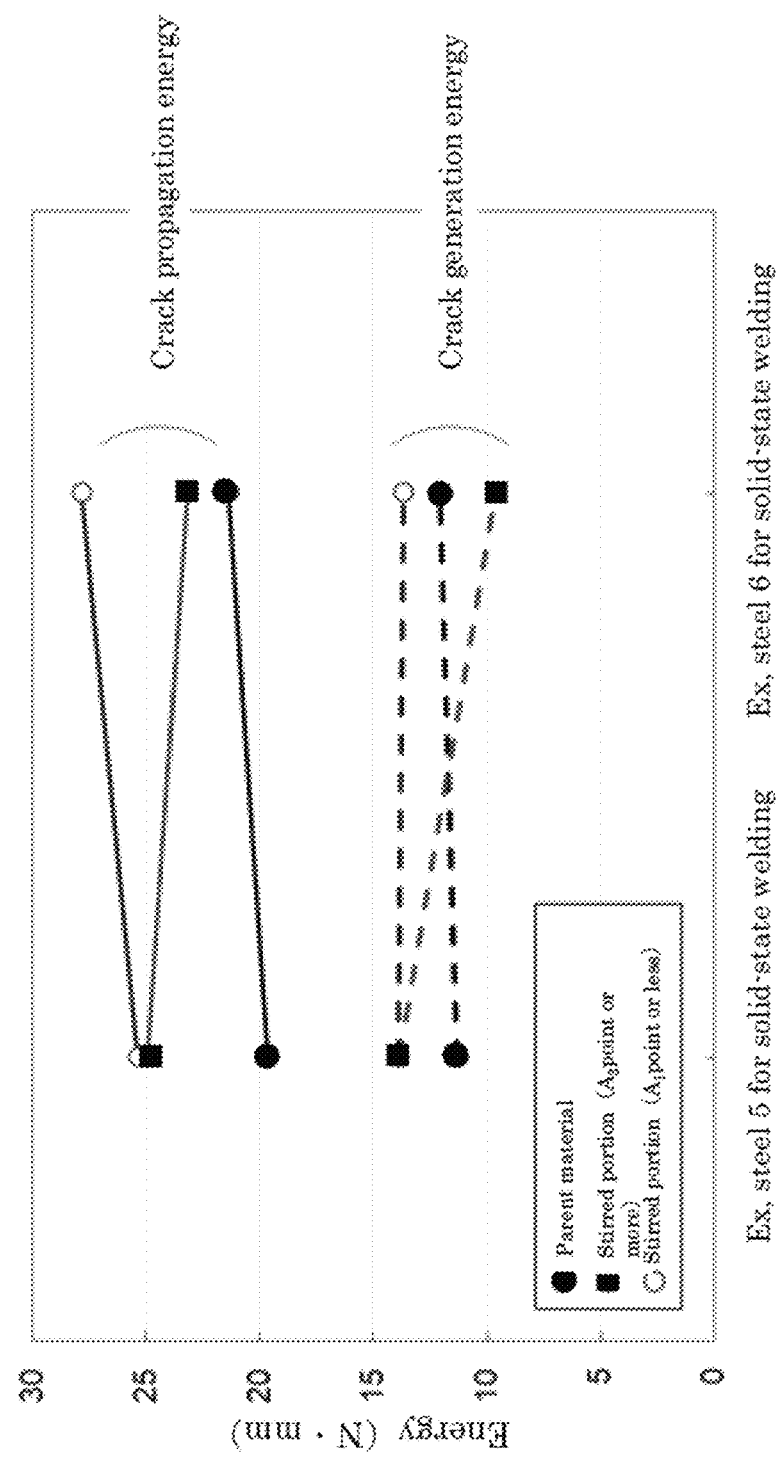
FIG. 21 is a graph which shows the crack generation energy and the crack propagation energy of the parent material and the stir zone of the example steel 5 for solid-state welding and the example steel 6 for solid-state welding.

The crack generation energy and the crack propagation energy were calculated from the area of the load displacement curve obtained in the micro-impact test of the parent material and the stir zone of the example steel 5 for solid-state welding and the example steel 6 for solid-state welding. The obtained results are shown in FIG. 21. The stir zone is evaluated in the case where the welding temperature is the A₃ point or more and the case where being the A₁ point or less. The sum of the crack generation energy and the crack propagation energy is the impact absorption energy.

In both the example steel 5 for solid-state welding and the example steel 6 for solid-state welding, the crack propagation energy of the stir zone is higher than that of the parent material. Regarding the crack generation energy, when the welding temperature of the example steel 6 for solid-state welding is the A₃ point or higher, the value is lower than that of the parent material, but the absorbed energy including the crack propagation energy is the value of the same degree as that of the parent material.

Figure 22:
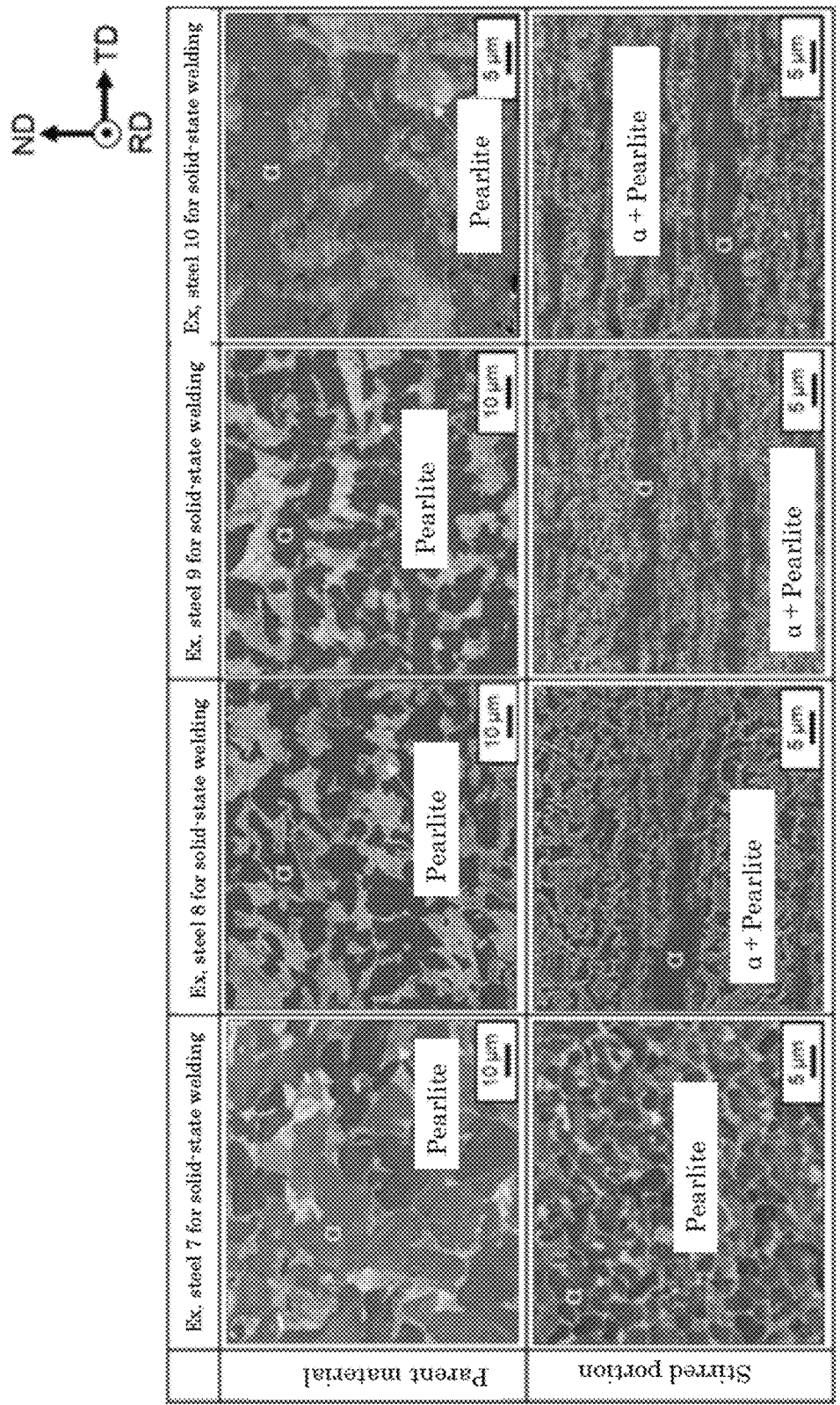
FIG. 22 is the SEM images of the parent material and the stir zone of the example steel 7 for solid-state welding to the example steel 10 for solid-state welding.

FIG. 22 shows the SEM images of the parent material and the stir zone of the example steel 7 for solid-state welding to the example steel 10 for solid-state welding. In all of the example steel 7 for solid-state welding to the example steel 10 for solid-state welding, both the parent material and the stir zone have the structure mainly composed of ferrite and pearlite, and the microstructure of the stir zone is remarkably refined as compared with the parent material. On the other hand, in the stir zone of the example steel 8 for solid-state welding to the example steel 10 for solid-state welding, the ferrite distributed in layers parallel to the TD direction is observed. This ferrite is not a crystal grain elongated in layers, but an aggregate in which equiaxed grains are distributed in layers. This layered ferrite aggregate increases with the increase of the amount of P added.

Figure 23:
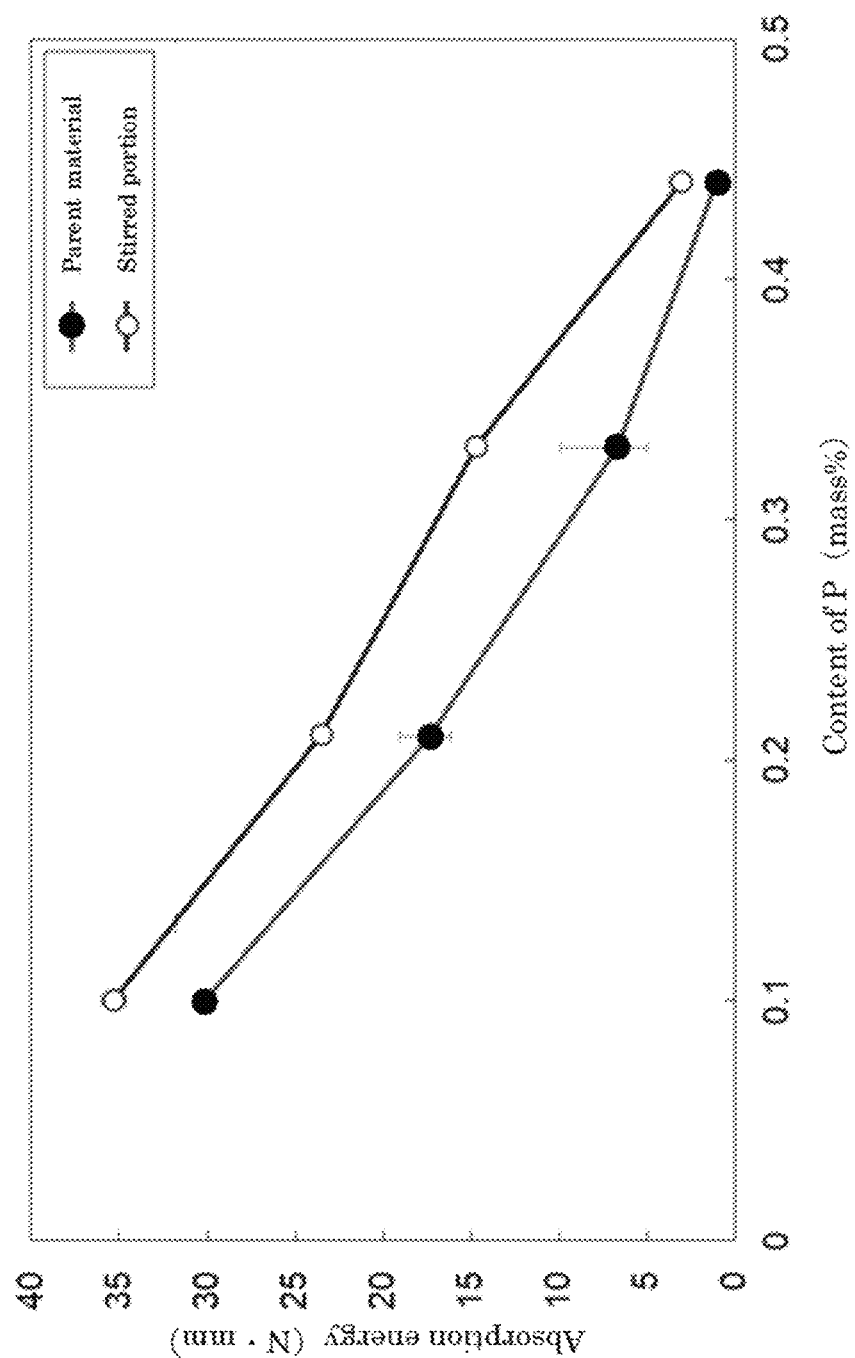
FIG. 23 is a graph which shows the relationship between the impact absorption energy and the addition amount of P in the parent material and the stir zone of the example steel 7 for solid-state welding to the example steel 10 for solid-state welding steel.

FIG. 23 shows the relationship between the impact absorption energy and the addition amount of P in the parent material and the stir zone of the example steel 7 for solid-state welding to the example steel 10 for solid-state welding steel. The impact absorption energy of both the parent material and the stir zone decreases as with the increase of the amount of P added, but it can be seen that the value of the stir zone is higher than that of the parent material in any case of the amount of P added.

When the impact absorption energies of the parent materials of the comparative steel 1 for solid-state welding, the comparative steel 2 for solid-state welding and the comparative steel 3 for solid-state welding were measured by the micro-impact test, they were 31.8 N·mm, 33.1 N·mm and 28.7 N·mm, respectively. Further, the stir zones formed at the welding temperature of the A₃ point or higher were 38.2 N·mm, 35.7 N·mm and 18.2 N·mm, respectively. In the comparative steel 1 for solid-state welding and the comparative steel 2 for solid-state welding, the amount of C and P added is suppressed in order to ensure weldability and reliability of the welded portion, and decrease of the impact absorption energy in the stir zone is not observed. On the other hand, in the comparative solid-state welding steel 3 containing 0.3% by mass of C, the impact absorption energy of the stir zone formed at the welding temperature of the A₃ point or higher is lower than that of the parent material.

EXPLANATION OF SYMBOLS

1 . . . Solid-state welded joint,
2, 4 . . . Material to be welded,
6 . . . Solid-state welded portion.

The invention claimed is:
1. A solid-state welded weathering steel having a steel composition; which consists of, in % by mass,
C: 0.10 to 0.60%,
P: more than 0.035 to 1.000%, and
optionally 0 to 3.00% Cu; 0 to 2.00% Mn; 0 to 1.00% Si; 0 to 2.00% Cr; 0 to 3.00% Ni; 0 to 1.00% Mo; and 0 to 0.03% Ti,
with the remainder Fe and unavoidable impurities,
wherein the weathering steel has a mixed microstructure of ferrite and fine cementite.
2. The solid-state welded weathering steel according to claim 1, wherein Cu is present, in % by mass,
Cu: more than 0 to 3.00%.
3. The solid-state welded weathering steel according to claim 1, wherein Mn is present, in % by mass,
Mn: more than 0 to 2.00%.
4. The solid-state welded weathering steel according to claim 1, wherein Si is present, in % by mass,
Si: more than 0 to 1.00%.

5. The solid-state welded weathering steel according to claim 1, wherein Cr is present, in % by mass, Cr: more than 0 to 2.00%.

6. The solid-state welded weathering steel according to claim 1, wherein Ni is present, in % by mass, Ni: more than 0 to 3.00%.

7. The solid-state welded weathering steel according to claim 1, wherein Mo is present, in % by mass, Mo: more than 0 to 1.00%.

8. The solid-state welded weathering steel according to claim 1, wherein Ti is present, in % by mass, Ti: more than 0 to 0.03%.

9. A welded structure having a solid-state welded portion of the weathering steel for solid-state welding according to claim 1, wherein the impact absorption energy of the solid-state welded portion is 90% or more of the impact absorption energy of the weathering steel for solid-state welding.

10. A method of solid-state welding to the weathering steel material for solid-state welding comprising the weathering steel for solid-state welding according to claim 1, wherein a welding temperature is set to an $A_3$ point determined by the chemical composition of the weathering steel for solid-state welding or less.

11. The method of solid-state welding according to claim 10, wherein the welding temperature is set to an $A_1$ point determined by the chemical composition of the weathering steel for solid-state welding or less.

12. The method of solid-state welding according to claim 10, wherein any one of the friction stir welding, the friction welding and the linear friction welding is used.

\* \* \* \* \*